(12) United States Patent
Niibe et al.

(10) Patent No.: US 8,391,715 B2
(45) Date of Patent: Mar. 5, 2013

(54) PASSIVE OPTICAL NETWORK SYSTEM

(75) Inventors: Masao Niibe, Fujisawa (JP); Masahiko Mizutani, Fujisawa (JP); Shinya Fujioka, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 164 days.

(21) Appl. No.: 13/072,112

(22) Filed: Mar. 25, 2011

(65) Prior Publication Data

US 2011/0243554 A1    Oct. 6, 2011

(30) Foreign Application Priority Data

Apr. 1, 2010    (JP) .................................. 2010-084791

(51) Int. Cl.
*H04J 14/00* (2006.01)
*H04B 10/04* (2006.01)

(52) U.S. Cl. ............. 398/71; 398/66; 398/98; 398/100; 398/197

(58) Field of Classification Search .................... 398/25, 398/35, 38, 58, 63, 66, 67, 70, 71, 72, 98–103, 398/140, 141, 154, 162, 165, 167.5, 182, 398/195, 197, 202, 212, 215
See application file for complete search history.

(56) References Cited

U.S. PATENT DOCUMENTS

| 2010/0034534 | A1 | 2/2010 | Niibe et al. |
| 2010/0067913 | A1 | 3/2010 | Niibe et al. |
| 2012/0063774 | A1* | 3/2012 | Niibe et al. ..................... 398/34 |
| 2012/0087662 | A1* | 4/2012 | Suzuki et al. ................... 398/66 |

FOREIGN PATENT DOCUMENTS

| JP | 2010-041610 | 2/2010 |
| JP | 2010-074214 | 4/2010 |

OTHER PUBLICATIONS

International Telecommunicaton Union; Gigabit-capable Passive Optical Networks (GPON): General characteristics; ITU-T Recommendation G.984.1; Mar. 2003; pp. 1-14.
International Telecommunication Union; Gigabit-capable Passive Optical Networks (GPON); Physical Media Dependent (PMD) layer specification; ITU-T Recommendation G.984.2; Mar. 2003; pp. 1-29.
International Telecommunication Union; Gigabit-capable Passive Optical NetWorks (G-PON): transmission convergence layer specification; ITU-T Recommendationn G.984.3; Feb. 2004; pp. 1-107.

* cited by examiner

*Primary Examiner* — Kenneth N Vanderpuye
*Assistant Examiner* — Daniel Dobson
(74) *Attorney, Agent, or Firm* — Foley & Lardner LLP

(57) ABSTRACT

When a neighbor ONU receives a signal with light intensity high enough to secure communication between an OLT and a remote ONU, the light intensity may be excessively high to damage a receiver of the neighbor ONU. In order to avoid such a problem, each ONU is notified of a downstream signal transmission plan (downstream light intensity map) prior to transmission of a downstream signal. Each ONU receives the downstream light intensity map (light intensity transmission schedule of downstream signal) in advance. Thus, the neighbor ONU can block or attenuate an optical signal addressed to the remote ONU, and the remote ONU can determine normal operation even when the remote ONU cannot receive a signal addressed to the neighbor ONU. Thus, the remote ONU can be prevented from issuing a wrong error signal.

5 Claims, 19 Drawing Sheets

| ITEM NO. | ONU-ID | DISTANCE | LIGHT INTENSITY | COMMUNICATION BIT RATE | |
|---|---|---|---|---|---|
| No.1 | 1 | 10km | LA10000 | 2.5Gbps | CONTENTS OF S-10040A |
| No.2 | 2 | 12km | LA10000 | 2.5Gbps | |
| ... | ... | ... | ... | ... | |
| No.v-1 | v-1 | 13km | LA10000 | 2.5Gbps | |
| No.v | v | 19km | LA10000 | 10Gbps | |
| ... | ... | ... | ... | ... | |
| No.w-1 | w-1 | 25km | LA10010 | 2.5Gbps | CONTENTS OF S-10040B |
| No.w | w | 30km | LA10010 | 2.5Gbps | |
| ... | ... | ... | ... | ... | |
| No.x-1 | x-1 | 39km | LA10010 | 2.5Gbps | |
| No.x | x | 22km | LA10010 | 10Gbps | |
| ... | ... | ... | ... | ... | |
| No.y-1 | y-1 | 50km | LA10020 | 2.5Gbps | CONTENTS OF S-10040C |
| No.y | y | 55km | LA10020 | 2.5Gbps | |
| ... | ... | ... | ... | ... | |
| No.z-1 | z-1 | 57km | LA10020 | 2.5Gbps | |
| No.z | z | 48km | LA10020 | 10Gbps | |
| ... | ... | ... | ... | ... | |

30000 / 30010 / 30020 / 30030

CONTENTS OF S-10050

COMMUNICATION BIT RATE INFORMATION IS REGISTERED ONLY WHEN PON SYSTEMS WITH DIFFERENT BIT RATES ARE MIXED

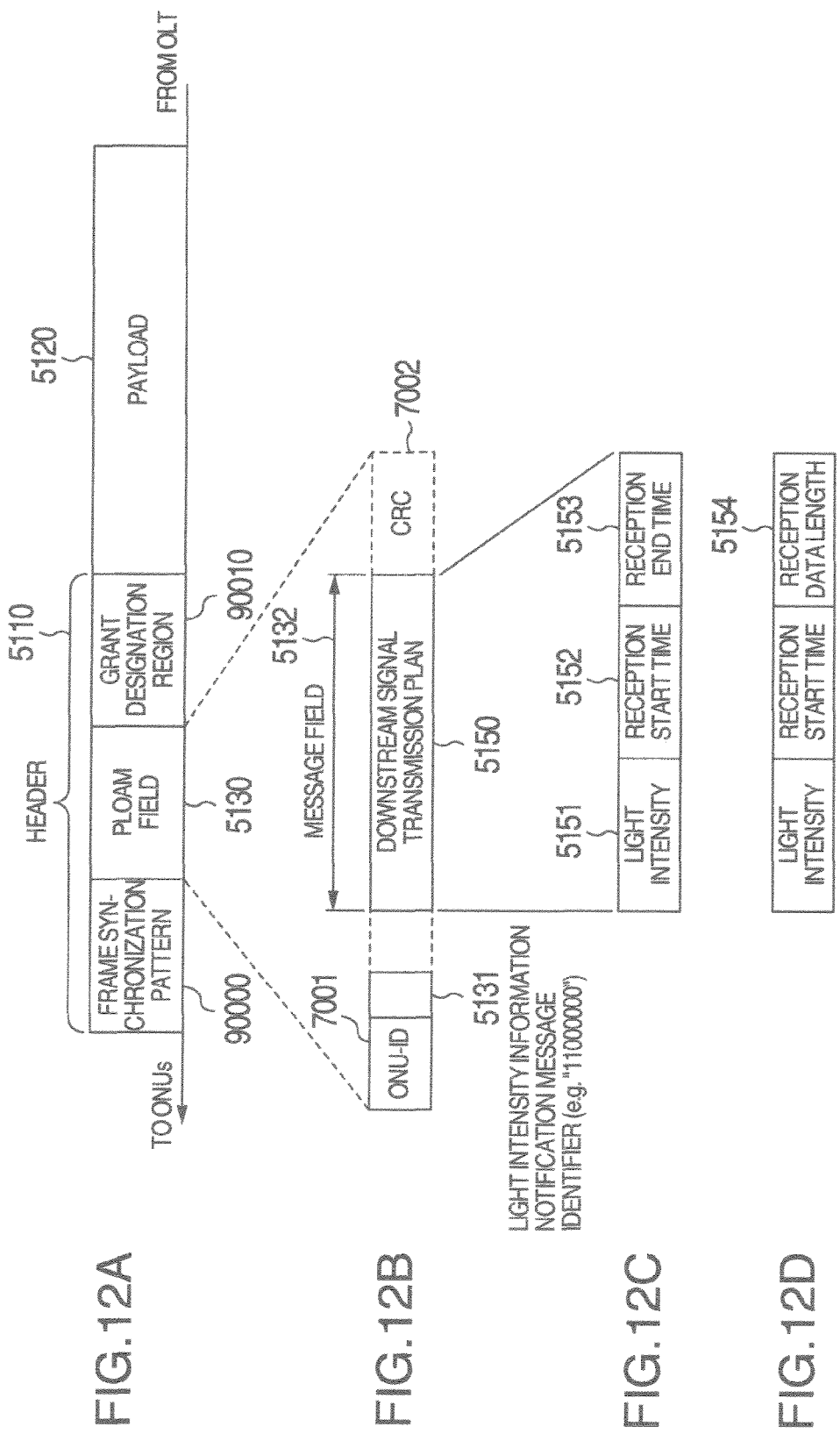

| OPERATION START TIME 1400 | SUPERFRAME CYCLE 1401 | RECEPTION START TIME 1402 | RECEPTION END TIME 1403 |
|---|---|---|---|
| 100000 | 400 | 125 | 250 |

2071

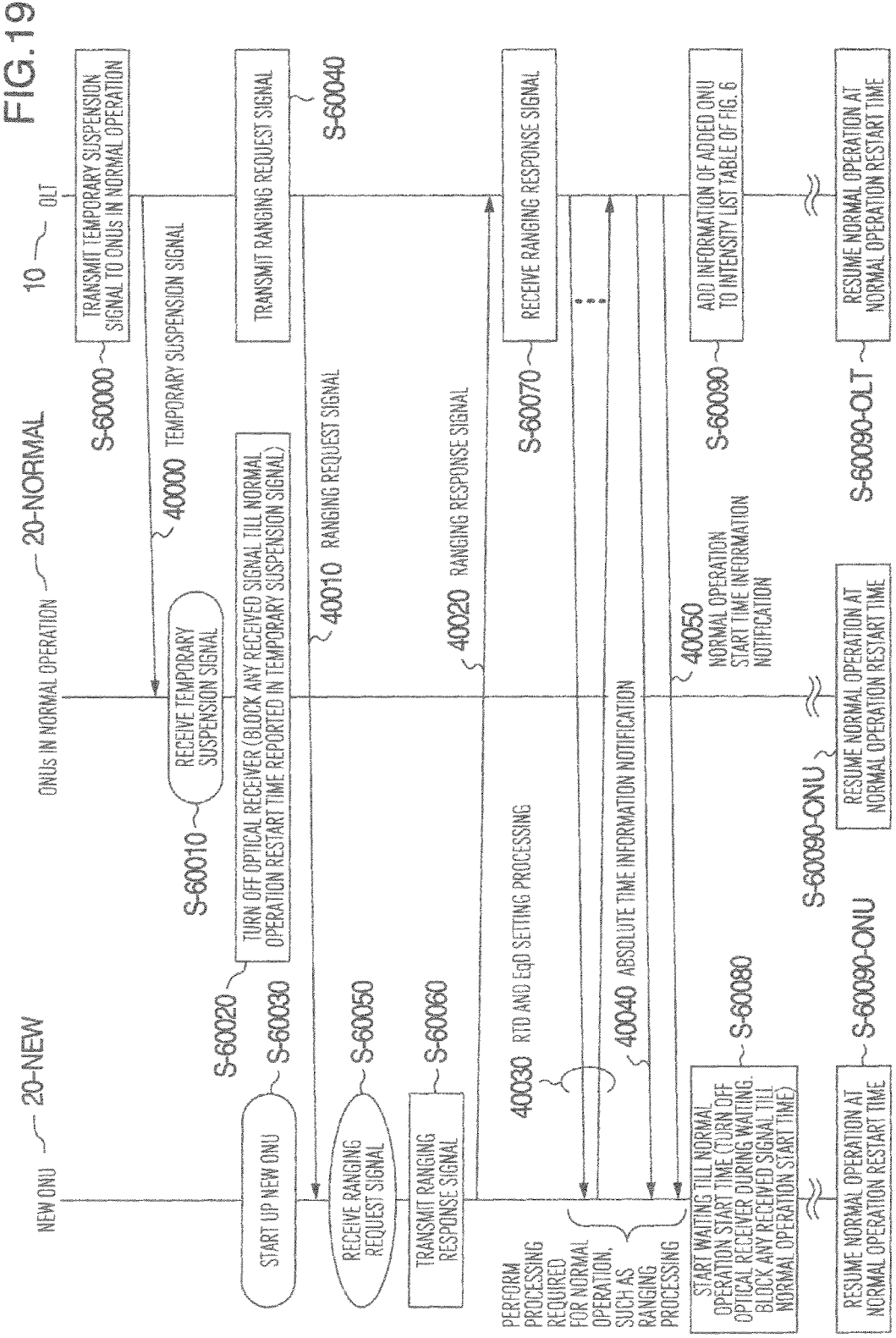

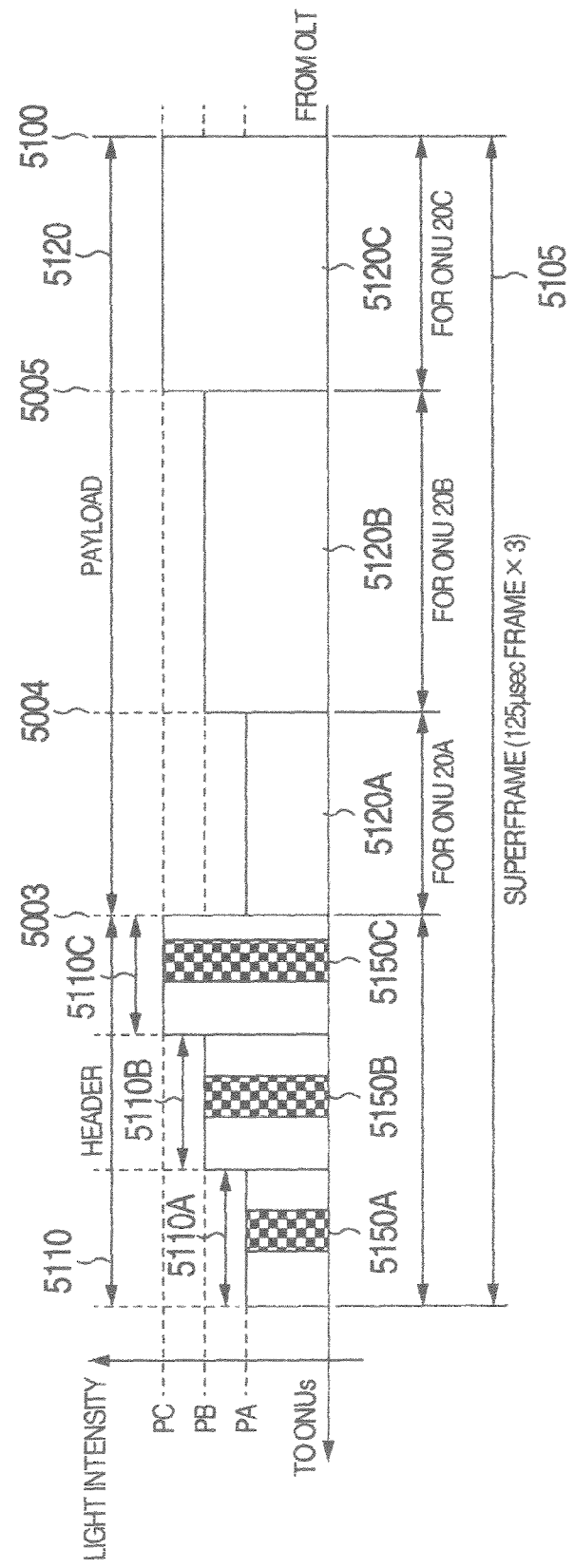

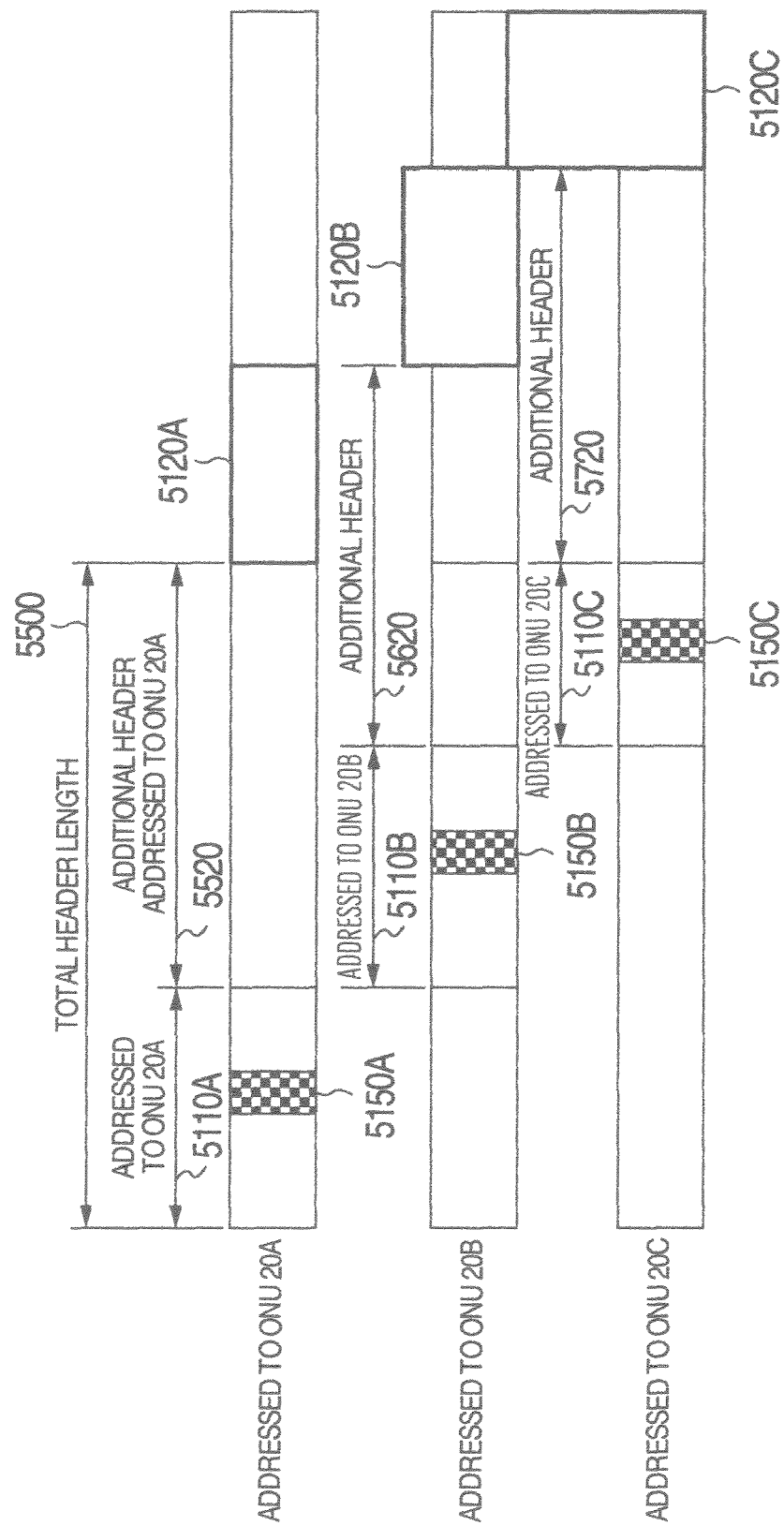

PASSIVE OPTICAL NETWORK SYSTEM

INCORPORATION BY REFERENCE

The present application claims priority from Japanese application JP2010-084791 filed on Apr. 1, 2010, the content of which is hereby incorporated by reference into this application.

BACKGROUND OF THE INVENTION

The present invention relates to a configuration of an optical communication system in which optical transmission lines are shared among a plurality of subscriber units, a method for operating the optical communication system, and system expansion such as extension of a transmission distance or increase in the number of accommodated subscribers in the system.

With an increasing demand for communication using broadband, access lines for users have been being shifted to large-capacity access lines using optical fibers in place of access technology based on telephone lines such as DSL (Digital Subscriber Lines). For recent access line services, PON (Passive Optical Network) systems (hereinafter also referred to as PONs simply or as optical passive network systems or passive optical network systems) are often used in view from the line construction cost and the maintenance management cost. Standardization in ITU-T (International Telecommunication Union Telecommunication Standardization Sector) is a typical example (see ITU-T Recommendations G984.1, G984.2 and G984.3). Introduction of GPON (Gigabit PON) into access networks have begun globally since about 2006.

PON is a system in which optical signals split and multiplexed using optical fibers and an optical splitter are transmitted and received between a station-side apparatus (hereinafter referred to as "OLT (Optical Line Terminal)") and subscriber units (hereinafter referred to as ONUs (Optical Network Units)). Due to limitation caused by the attenuation of an optical signal passing through each optical fiber or the number of optical branches in the optical splitter, there is a certain critical distance for communication between the OLT and each ONU. To take a specific example, a GPON is used with communication sections set at up to 20 km and with the number of branches (the number of ONUs which can be connected to an OLT) set at up to 64.

With increasing opportunities for ordinary home subscribers (communication network users) to gain access to the Internet for communication to gather information or to organize their social lives, it has been requested to organize communication networks, particularly to enhance access network providing services for connecting the subscribers to the communication networks. That is, any carrier providing a communication network is driven under the pressure of capital expansion for increasing the number of users who can be accommodated in each station with increase of the number of users in each access line. As a method for increasing the number of users, it can be considered to introduce an additional PON for use in an access network, that is, to add another OLT, or to expand the number of users who can be accommodated. i.e. the number of ONUs which can be accommodated, in each PON system. In a typical PON, however, an OLT carries out complicated system control including the bandwidth control and the administration of ONUs accommodated therein. The OLT is much more expensive than each ONU. In addition, the cost to lay new optical fibers brings large expenses to the carrier. From the above description, expansion of the number of ONUs which can be accommodated in each OLT is a desirable solution.

On the other hand, in order to enhance access network providing services, a next-generation PON which is referred to as 10GPON (10 Gigabit PON) or 10GEPON (10 Gigabit Ethernet PON) has been looked into in ITU-T or IEEE (Institute of Electrical and Electronics Engineers) as means for transmission at a higher bit rate than the background art. In transmission at such a higher bit rate, attenuation or variance of optical signals passing through optical fibers has greater influence than in transmission at a bit rate according to the background art. Accordingly, in order to build a system with a communication distance as long as that in an existing PON, it is necessary to provide optical receiving devices with wider dynamic ranges, optical fibers with higher performance, and a variance compensation function. Although higher bit rates may increase the number of users who can be accommodated, increase in the development cost will become a problem.

SUMMARY OF THE INVENTION

One of methods for expanding a PON section is a method in which a light amplifier is applied to a downstream signal transmitting light laser of an OLT to increase optical power or a method in which a light amplifier (optical signal relay unit) called a reach extender (RE) is provided in the PON section to expand the communication distance.

When a light amplifier is introduced, the communication distance is made longer than in a conventional PON. As a result, an ONU of a subscriber existing in a remote site can be accommodated in the same OLT so that the number of users accommodated by the OLT can be increased easily. That is, the efficiency with which ONUs can be accommodated in the OLT is improved. ONUs connected to the OLT installed in a station can be distributed in a wider range than at present.

On the other hand, due to the expansion of the ONU distribution, however, there arises a problem that the intensity of a downstream signal to be sent out from the OLT to the ONUs varies largely between the closest ONU to the OLT and the farthest ONT from the OLT so that the intensity may exceed the allowable range of optical receiving sensitivity in each optical receiving device. The problem results from the fact that the variation in the distance of an optical fiber through which an optical signal passes till arrival at each ONU becomes larger than the background art. Further, when the PON includes a plurality of splitters, the light intensity of a downstream signal received by each ONU varies in accordance with the number of splitters through which the downstream signal passes till arrival at the ONU. In view of the PON introduction cost, it is generally requested to provide all the ONUs with the same performance. On this condition, a wider dynamic range than in a conventional PON must be required in each ONU-side receiver due to the expanded variation in the distance between the OLT and each ONU. It is, however, difficult to improve the performance of each optical receiving device on a large scale in a short time. It is therefore likely that a signal which can be received by an ONU close to the OLT cannot be recognized by an ONU distant from the OLT but, on the contrary, a receiving device in the close ONU may be damaged when the close ONU receives an optical signal transmitted to the distant ONU.

Furthermore, as in the background of the present technique, it will be requested in the near future to additionally introduce a high bit rate transmission technique which will target 10 Gbps in a next-generation PON. Such a novel PON is required to coexist with an existing Giga-bit-rate-class PON. This may lead to a case with a system configuration in which a communication bit rate in a PON section varies in spite of the same distance between an OLT and an ONU as that in the existing PON. On this occasion, in spite of the same distance, there occurs a considerable difference in the intensity of light received by the ONU side due to the difference in optical transmission characteristics caused by the difference in the bit rate.

An object of the present invention is to provide a method in which, even when light amplifiers are introduced into a PON to extend the communication distance between an OLT and each ONU or increase the number of accommodated ONUs, all the ONUs each having equal performance can receive a downstream signal from the OLT while suppressing a failure of a optical receiver due to excessive light intensity of reception etc. or wrong reception occurring due to deterioration of the optical signal in each ONU. Preferably, the invention is to provide a PON and a PON control method in which the occurrence of the aforementioned problems can be suppressed without largely changing functions provided in a background-art PON.

In order to solve the aforementioned problems, an optical communication system according to the invention is configured so that a subscriber accommodating apparatus such as an OLT sends subscriber units such as ONUs a notification of a signal transmission plan including light intensity information of a downstream signal prior to transmission of the downstream signal from the subscriber accommodating apparatus to the subscriber units, based on a result of ranging between the subscriber accommodating apparatus and each subscriber unit, which result is held by the subscriber accommodating apparatus. Based on the information given beforehand, each subscriber unit determines its own timing of reception of the downstream signal and blocks its own optical receiver from receiving any optical signal transmitted at any other time slot.

According to the invention, light amplifiers can be introduced into an optical communication system to extend a communication distance between a subscriber accommodating apparatus and each subscriber unit or to increase the number of accommodated subscriber units. Even if the optical communication section length and the transmission bit rate differ from one subscriber unit to another, the subscriber units having the same performance (in each bit rate) can be used for communication regardless of the connection sites of the subscriber units because the subscriber units are informed of the timing of reception of a signal from the subscriber accommodating apparatus beforehand. It is therefore possible to reduce the development cost about provision of the subscriber units and the operation cost about the distribution and maintenance of the subscriber units. In addition, as compared with an existing PON, it will go well if a slight change is made on a format for use in transmission of a downstream signal in the subscriber accommodating apparatus. Thus, there is an effect that it is possible to suppress the increase of the total cost of an optical access network enhancing project including system development, introduction, etc. with the expansion of the number of accommodated users.

Other objects, features and advantages of the invention will become apparent from the following description of the embodiments of the invention taken in conjunction with the accompanying drawings.

BRIEF DESCRIPTION OF THE DRAWINGS

FIG. 11 is a configuration example of a light intensity correspondence table 1064;

FIGS. 12A-12D are signal configuration diagrams showing an example of a transmission method of a downstream signal transmission plan 5150;

FIG. 19 is a sequence chart showing an example of a procedure for registering a new ONU in a PON system 1 which is normally operating; and FIGS. 20A and 20B are signal configuration diagrams showing an configuration example of a downstream frame using a method for consolidating header information in the head or a superframe.

DETAILED DESCRIPTION OF THE INVENTION

The configuration and operation of a PON according to the invention will be described below with reference to the drawings using the configuration and operation of a GPON provided in ITU-T recommendation G984.3 by way of example.

In a background-art PON having a GPON as its representative example, a communication distance variance range of subscriber units ONUs included in each PON system, that is, a difference in distance between an ONU which is located to be the closest to an OLT 10 and an ONU which is disposed at a location the farthest from the OLT 10 is set within 20 km. To this end, a transmitted light intensity range and a received light sensitivity range in each optical module is defined within a possible range of optical communication with the OLT 10 without consideration of the distance variance among the ONUs. In a typical PON, once optical fibers have been laid, the optical fibers will not be replaced frequently as long as there occurs no considerable accident or the like. In addition, once ONUs have been installed in their sites, the setting conditions of the PON will not be changed without occurrence of circumstances such as moving, urban renewal, etc. Due to such a stable system where there should exceedingly rarely occur opportunities of changing the communication quality, it is desirable to extend the system without changing existing units and optical devices.

Figure 1:
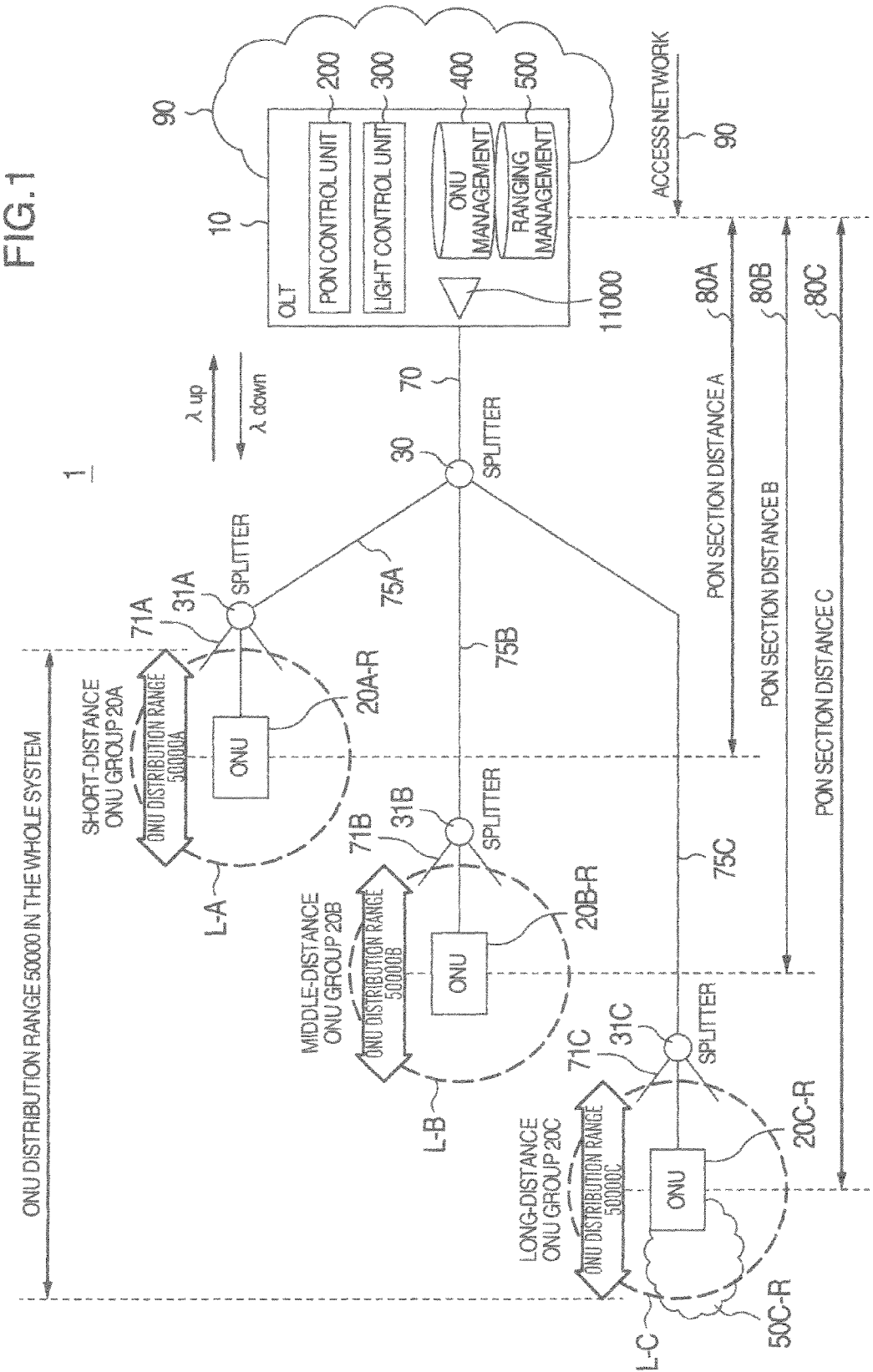
FIG. 1 is a network configuration diagram showing a PON extension system or explaining an embodiment of the invention.

FIG. 1 is a network configuration diagram of a PON 1 showing a PON extension system for explaining an embodiment of the invention. In order to reuse existing units and optical devices as many as possible, this embodiment is first characterized in that ONUs constituting the PON 1 are grouped and connected so that the difference range among their distances from an OLT 10 can be set at up to 20 km. Specifically; second-stage splitters 31A, 31B and 31C for bundling ONUs 20 group by group are provided to serve under a first splitter 30. ONUs are connected to the second splitters 31A to 31C. To this end, in FIG. 1, the second splitters 31 are placed in addition to the first splitter 30, and the second splitters 31 are connected to the first splitter 30 through optical fibers 75A, 75B and 75C respectively. In addition, in this configuration, the ONUS serving under the second splitters are classified into ONU groups 20A, 20B and 20C in accordance with their communication distances. The ONUs 20 are connected to the splitters 31 through second branch fibers 71A to 71C individually. Each ONU group 20A-20C includes a plurality of ONUs. FIG. 1 depicts ONUs 20A-R, 20B-R and 20C-R as representative ONUs of the groups respectively. It is assumed here that ranges 50000A, 50000B and 50000C of distance differences among ONUs are up to 20 km in the ONU groups 20A, 20B and 20C respectively.

The PON 1 is a system where the ONUs 20 are connected to subscriber networks 50 (or terminals such as PCs and phones, only a subscriber network 50C-R connected to the ONU 20C-R is depicted as an representative example in FIG. 1), and the OLT 10 is further connected to an access network 90 serving as an upper-level communication network. Here, assume that light amplifiers are introduced into PON sections in place of a light amplifier 11000 placed inside the OLT 10. In this case, a light amplifier is, for example, introduced into each optical fiber (the optical fiber 75B, 75C in FIG. 1) of each branch network, and a telecommunications carrier adjusts the light amplifier so that a signal with proper light intensity can reach destination ONUs (ONU groups 20B and 20C in FIG. 1). By such adjustment, there will arise no problem in signal reception, no matter how far the distance between each ONU 20 and the OLT 10 is. However, there arises a problem that the cost about the installation and maintenance of the light amplifiers increases. In practical operation, therefore, light amplifiers should be introduced only into backbone-network optical fibers (the optical fiber 70 in FIG. 1) so that the number of introduced light amplifiers can be suppressed to be a required minimum number. Where to dispose the light amplifiers gives no essential influence to the invention, but the following embodiment will be described based on the configuration of FIG. 1 in which the maintenance cost of the light amplifiers can be reduced to the minimum.

The OLT 10 is an apparatus which transmits/receives information to/from an upper-level communication network through the access network 90 and further transfers the information to the ONUs 20 so as to transmit/receive information signals. A packet communication network constituted by an IP router, an Ethernet (registered trademark) switch, etc is often used as the access network 90, but another communication network may be used. Each ONU 20 is typically installed in a user home or a business site and connected to a subscriber network 50 which is a LAN or a corresponding network. A telephone terminal or an information terminal such as a PC or a portable terminal for providing an IP telephone or existing telephone service is connected to each subscriber network 50. In each PON section 80A-80C, communication using an optical signal is carried out between the OLT 10 and each ONU included in each ONU group 20A-20C. In the PON, an upstream optical signal to be used has a wavelength λup different from a wavelength λdown of a downstream optical signal to be used, so as to prevent the signals from interfering with each other in the optical fibers 70, 75A-75C and 71A-71C or in the splitters 30 and 31A-31C.

A downstream signal transmitted from the OLT 10 to each ONU 20 is amplified or intensity-adjusted by an intensity control unit 11000 constituted by a light amplifier or the like. The downstream signal branched by the splitter 30 and the splitters 31A-31C reaches the ONU groups 20A-20C constituting the PON 1. The downstream signal will be explained in a GPON by way of example. A downstream signal from the OLT 10 is sent out using a frame serving for communication in the PON sections 80A-80C (hereinafter referred to as downstream basic frame). The downstream basic frame accommodates a frame called a GEM (GPON Encapsulation Method) frame. Each GEM frame consists of a header and a payload, and an identifier for identifying an ONU 20 as a destination of the GEM frame (hereinafter also referred to as Port-ID) is inserted into the header. Each ONU extracts the header of each GEM frame, and carries out processing on the GEM frame when the destination Port-ID of the frame designates the ONU itself. The ONU abandons the frame when the destination of the frame is another ONU 20.

For upstream communication from the ONUs 20 to the OLT 10, electronic signals using optical signals with the same wavelength λup are sent out from all the ONUs 20. A variable-length frame consisting of a header and a payload is used as each upstream signal from each ONU 20 in the same manner as each downstream signal. Each upstream frame includes a GEM frame. The ONUs 20 send upstream signals with transmission timings shifted from one another to prevent the upstream signals from interfering with one another on the concentration optical fiber 70, so that the OLT 10 can identify GEM frames from the ONUs 20 individually. Those signals are multiplexed by time division on the concentration optical fibers 71A-71C, 75A-75C and 70, and reach the OLT 10. Specifically, (1) the distance between the OLT 10 and each ONU 20A-1 to 20C-n is measured in a ranging step and the amount of delay of each signal is adjusted, (2) the OLT 10 gives each ONU 20A-1 to 20C-n an instruction to declare the amount of data to be transmitted, (3) based on the declaration, the OLT 10 designates an amended upstream signal transmission timing and an amended transmittable upstream communication data volume to each ONU 20A-1 to 20C-n using a DBA (Dynamic Bandwidth Assignment, which is a function of dynamically assigning a communication bandwidth (time slot) for an upstream signal to each ONU 20, and which will be also referred to as dynamic bandwidth assignment) function, and (4) each ONU 20 transmits upstream communication data at the timing designated by the OLT 10. Then, those signals are multiplexed by time division on the concentration optical fibers 71, 75 and 70, and reach the OLT 10. The OLT 10 receiving the signals knows the timing designated to each ONU 20. Thus, the OLT 10 identifies each signal from each ONU 20 from the multiplexed signal, and carries out processing on a received frame.

An example of system operation for the aforementioned upstream communication will be described. When the PON 1 is started up, the OLT 10 first measures a round trip delay (RTD) between the OLT 10 and each ONU 20 individually in the ranging step carried out at the start-up time of the ONU 20, and decides the value of an equalization delay (EqD) based on the measurement result. The EqD is stored in a ranging management DB 500 of the OLT 10. This ranging may be performed using a ranging method according to ITU-T recommendation G.984.3. The EqD is set to equalize the time of response from each ONU 20 to the OLT 10 in the system in the same manner as an EqD in an existing PON.

EqD information and RTD of the PON section 80 are held in the ranging management DB 500 of the OLT 10. By virtue of the EqD information and the RTD, the OLT 10 can properly receive an upstream signal from a corresponding ONU 20 when the OLT 10 receives the upstream signal from the ONU 20 after the OLT 10 assigns a bandwidth to each ONU 20.

Figure 2:
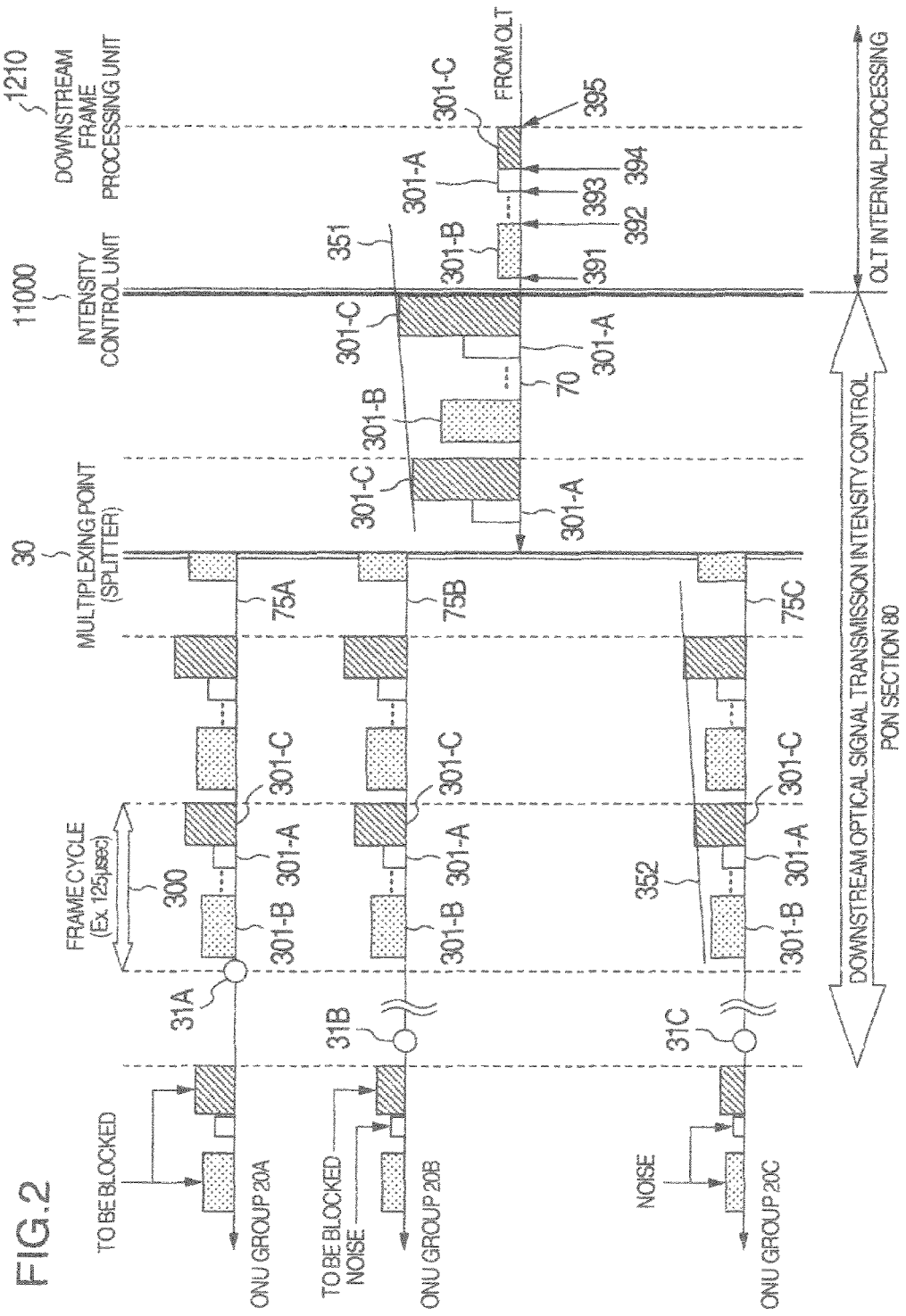
FIG. 2 is a signal configuration diagram showing a state of downstream signal e-division multiplexing transmission in an embodiment of the invention.

FIG. 2 is a signal configuration diagram showing a state of downstream signal time-division multiplexing transmission in the PON 1. FIG. 2 shows a state in which downstream signals from the OLT 10 to the ONUs 20 are transmitted and multiplexed, and the interval between the broken lines designates a frame cycle (125 microseconds). Further, additional lines 351 and 352 depict the state where the intensity of each optical signal decreases gradually while passing through an optical fiber (as well as the deterioration of the S/N ratio and the lowering of the signal identification level caused by the wavelength dispersion effect).

An optical signal sent out to the single concentration optical fiber 70 is passed through the splitter 30 and branched into the branch optical fibers 75A to 75C. The branched signals are further branched in the splitters 31A to 31C and distributed to the branch optical fibers 71A to 71C. The light intensity of the signal is lowered when the signal passes through the splitters 30 and 31. The signal is transmitted from the OLT 10 with intensity required to reach an intended ONU 20 in consideration of the lowering of the light intensity. Each ONU receives the downstream signal through the corresponding branch optical fiber 71A-71C. In FIG. 2, optical signals 301-A to 301-C show transmission positions and transmission data sizes of downstream frames transmitted to the ONU groups 20A to 20C respectively.

In addition, FIG. 2 depicts differences in intensity among optical signals transmitted from the OLT 10 to the ONUs 20, FIG. 2 shows that light of a reception signal addressed to the ONU group 20C is the most intensive, light of a reception signal addressed to the ONU group 20B is the second intensive, and light of a reception signal addressed to the ONU group 20A is the third intensive. Information is transmitted with the relationship among the intensities of the optical signals also kept on the concentration optical fiber 70 after the optical signals have passed through the splitter 30. Processing between a downstream frame processing unit 1210 and the intensity control unit 11000 is processing carried out inside the OLT 10. Each optical signal in the PON section 80 shows the state (timing and intensity) of the optical signal in each section.

The following operation is performed as soon as each downstream optical signal arrives. The ONU group 20A receives the optical signal 301-A. The ONU group 20A is a group which is the closest to the OLT 10. Any other signal is more optically intensive than the signal addressed to the ONU group 20A. Therefore, those signals (signals 301-B and 301-C in FIG. 2) are blocked by use of an intensity control unit 2311 of each ONU 20.

The ONU group 20B performs the following processing on each downstream signal. The light intensity of the signal 301-A addressed to the ONU group 20A has been already lower than the noise level. Thus, the signal 301-A is not regarded as a significant signal. However, the signal 301-C addressed to the ONU group 20C still has sufficient intensity. Each ONU of the ONU group 20B blocks the signal 301-C in order to protect its own optical receiver from failure. In the ONU group 20C, any other signal than the signal addressed to itself has been buried in the noise level. Accordingly, there is no signal to be blocked specifically.

Figure 3:
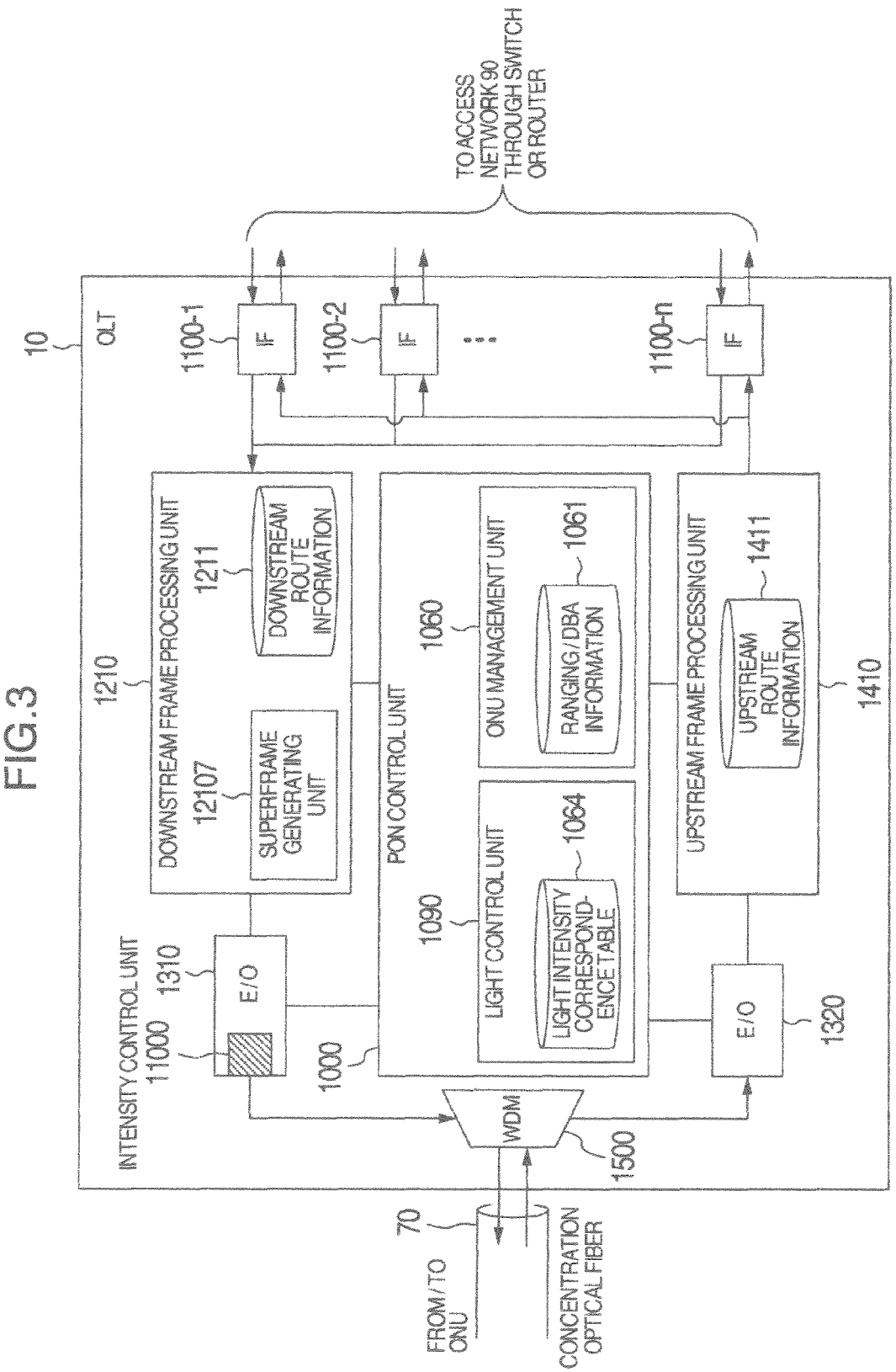
FIG. 3 is a block configuration diagram showing a configuration example of an OLT.

FIG. 3 is a block configuration diagram showing a configuration example of the OLT 10 for carrying out downstream communication from the OLT 10 to each ONU 20 in FIG. 2. Downstream signals are inputted from the access network 90 to IFs 1100-1 to 1100-$n$ called SNIs (Service Network Interfaces). A packet communication network is often used as the access network 90, and an Ethernet interface of 10/100 Mbps or 1 Gbps is often used as each IF. However, the invention is not limited to this configuration. Each reception signal (hereinafter any signal will be also referred to as data or packet) is transferred to the downstream frame processing unit 1210 and capsuled into a GEM frame.

Specifically, the downstream frame processing unit 1210 analyzes header information of a packet based on flow identification information including destination information, source information and route information included in the header of the packet, and decides a destination ONU 20 to which the received packet should be transferred. In addition to the decision of the destination information, the downstream frame processing unit 1210 performs conversion or attachment on the header information of the received packet in accordance with necessity. The downstream frame processing unit 1210 is provided with a downstream route information DB 1211 for deciding processing including the destination decision and the conversion and attachment of header information. Configuration is made so that one or a plurality of parameters included as header information of the received packet serves as a trigger to make the downstream frame processing unit 1210 perform the aforementioned processing with reference to the DB 1211

The downstream frame processing unit 1210 further has a frame generation function by which the format of the received packet is converted into a frame format for transmission to the PON section 80 in accordance with the header processing contents decided in the downstream frame processing unit 1210 itself. For example, specific processing is performed to transmit an Ethernet received packet to the PON section 80 of GPON as follows: (1) to extract header information of the Ethernet packet, (2) to retrieve the downstream route information DB 1211 in the downstream frame processing unit 1210 by use of the header information as a trigger to decide VLAN tag processing (conversion, deletion, transmission, attachment, etc.) to be performed on the received packet, and a destination of the packet, (3) to generate a GEM header including a Port-ID set for a corresponding forwarding destination ONU by means of the frame generation function, and (4) to attach the GEM header to the received packet and capsule the Ethernet packet as a GEM frame. A superframe generating unit 12107 selects one ONU from each ONU group 20A to 20C, that is, a total of three ONUs, and adjusts GEM frames addressed to the selected ONUs one by one to load each GEM frame on a 125-microsecond frame which is a basic frame of G-PON. The GEM frames selected thus by the superframe generating unit 12107 are read from the downstream frame processing unit 1210 and converted from electric signals to optical signals by an E/O processing unit 1310.

After that, the optical signals are transmitted to the ONUs 20 through a wavelength-division multiplexer (WDM) 1500 and the concentration optical fiber 70.

A PON control unit 1000 provided in the OLT 10 according to the invention is a unit which performs general control on the PON 1 including upstream and downstream bidirectional signal transmission control as well as control for setting, management, etc. on each ONU 20. In this embodiment, the OLT 10 controls the intensity of each downstream optical signal. In order to control the light intensity of each do stream signal, the OLT 10 is designed to include a light control unit 1090 as a function of the PON control unit in the embodiment. A light intensity correspondence table 1064 holds information about intensity of an optical signal to be transmitted to each ONU in association with identification information of the ONU. The light control unit 1090 refers to the light intensity correspondence table 1064 to acquire intensity information of an optical signal corresponding to identification information of a destination ONU of each frame. The light control unit 1090 notifies the intensity control unit 11000 of the acquired intensity information.

Based on the intensity information sent from the light control unit 1090, the intensity control unit 11000 provided in the E/O processing unit 1310 transmits an optical signal with light intensity which varies according to the ONU group to which the destination ONU 20 of the frame to be transmitted belongs. The intensity control unit 11000 is implemented as an optical amplifier and a circuit (not shown) for setting the gain of the optical amplifier. The circuit for setting the gain is controlled under the instruction of the intensity information sent from the light control unit 1090. By way of example, the light intensity correspondence table 1064 may be set based on ranging information (communication distance information of each PON section calculated based on RTD) held by an ONU management unit 1060.

Figure 4:
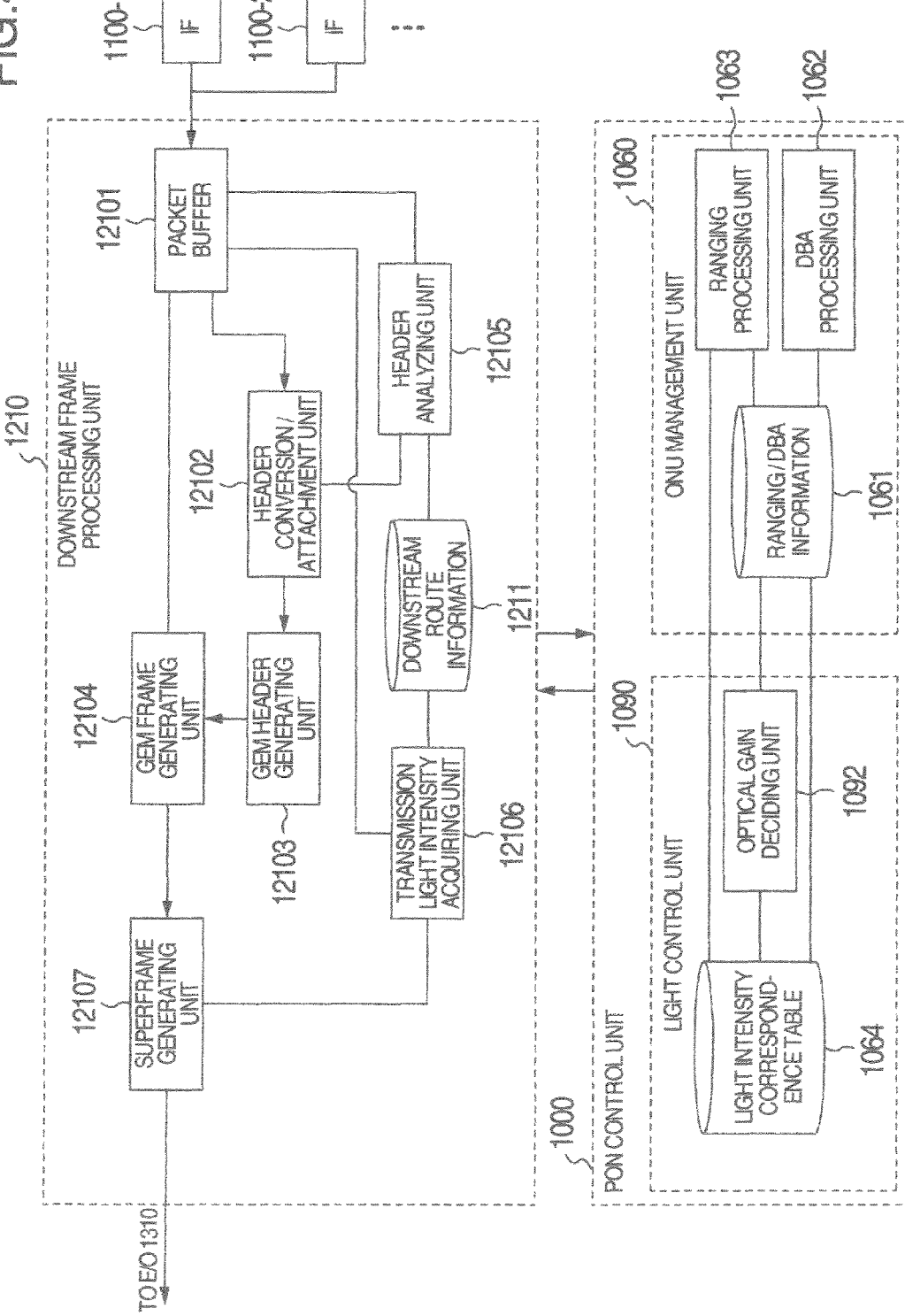
FIG. 4 is a functional configuration diagram showing a configuration example of a downstream frame processing unit and a PON control unit of the OLT.

FIG. 4 is a functional configuration diagram for explaining the downstream frame processing unit 1210 and the PON control unit 1000 of the OLT configuration diagram of FIG. 3 further in detail. The downstream frame processing unit 1210 includes a packet buffer 12101, a header conversion/attachment unit 12102, a GEM header generating unit 12103, a GEM frame generating unit 12104, a header analyzing unit 12105, downstream route information 1211, a transmission light intensity acquiring unit 12106, and a superframe generating unit 12107. The PON control unit 1000 includes a ranging processing unit 1063, a DBA processing unit 1062 and ranging/DBA information 1061 in the ONU management unit 1060. The light intensity control unit 1090 includes an optical gain deciding unit 1092 and the light intensity correspondence table 1064 which should be referred to by the deciding unit 1092.

Each downstream packet transferred to the downstream frame processing unit 1210 is processed in the following procedure. A downstream packet received in the interface 1100 is once stored in the packet buffer 12101, passes through the GEM frame generating unit 12104, and is then transferred to the E/O conversion unit 1310 via the superframe generating unit 12107. In this sequence of processing, (1) analysis of header information and decision of a transfer route, and (2) decision of transmission light intensity of the downstream packet and generation of a downstream light intensity map are performed in the downstream frame processing unit 1210 before packet information is sent to the GEM frame generating unit 12104.

In the processing (1), the header analyzing unit 12105 acquires a header unit of the received packet from the packet buffer 12101, and decides the necessity of header conversion and the method of conversion (attachment, deletion, transmission or conversion) based on flow identification information including destination information, source information and route information included in the header unit. This decision is made by the header analyzing unit 12105 which refers to a part (for example, destination information) or all of the flow identification information of the packet to check the information with a route table held in the downstream route information DB 1211. With reference to the contents of header conversion obtained thus, the GEM header generating unit 12103 generates GEM frame header information corresponding thereto, and transfers the GEM frame header information to the GEM frame generating unit 12104.

In the processing (2), the transmission light intensity acquiring unit 12106 acquires the header unit of the downstream packet from the packet buffer 12101, delivers ONU identification information included in the header information to the optical gain deciding unit 1092 provided in the PON control unit 1000, and requests the optical gain deciding unit 1092 to specify a proper light intensity for transmitting the downstream packet. The optical gain deciding unit 1092 acquires an optical gain or a light intensity corresponding to the destination ONU of the packet with reference to the light intensity correspondence table 1064, and sends the acquired optical gain or light intensity to the transmission light intensity acquiring unit 12106 of the downstream frame processing unit 1210. The light intensity correspondence table 1064 is provided with a function of calculating a light intensity required for communication with each individual ONU based on communication distance measurement using ranging processing performed when the ONU is started up.

The DBA processing unit 1062 included in the ONU management unit 1060 is a function block for calculating a timing when each individual ONU 20 should send out an upstream signal (packet). In the same manner as DBA used for assigning a bandwidth for an upstream signal in a background-art PON, the thus calculated bandwidth assignment condition is once held in the ranging/DBA information DB 1061 till the assigned upstream frame is completely received.

The GEM frame generating unit 12104 couples the GEM frame header information generated by the GEM header generating unit 12103 with data (frame payload) stored in the packet buffer 12101 so as to generate a downstream GEM frame. The superframe generating unit 12107 selects one GEM frame addressed to an ONU belonging to the ONU group 20A, one GEM frame addressed to an ONU belonging to the ONU group 20B, and one GEM frame addressed to an ONU belonging to the ONU group 20C from GEM frames generated thus, loads the three GEM frames on 125-microsecond basic frames respectively, and couples the three 125-microsecond basic frames to generate a superframe.

Figure 5:
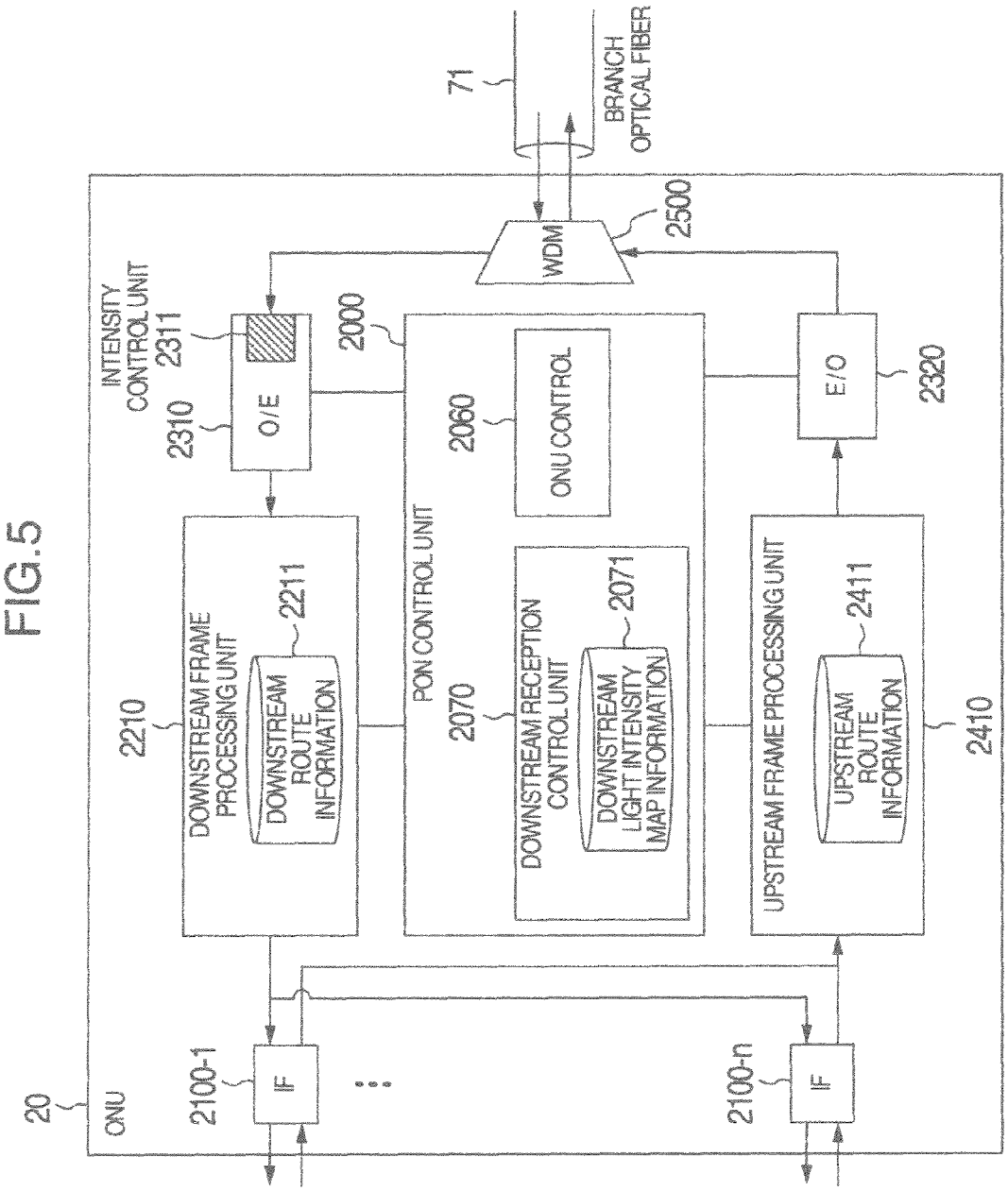
FIG. 5 is a block configuration diagram showing a configuration example of an ONU.

FIG. 5 is a block configuration diagram showing a configuration example of each ONU 20 of the PON 1. Upstream signals from terminals (not shown) accommodated by the ONU 20 to the PON 1 are inputted into IFs 2100-1 to 2100-$n$ called UNIs (User Network Interfaces) through the subscriber network 50. A LAN or a packet network is often used as the subscriber network 50, and an Ethernet interface of 10/100 Mbps or 1 Gbps is often used as each IF. However, the invention is not limited to this configuration.

The configuration and operation for processing downstream signals and upstream signals in each ONU 20 are substantially the same as the configuration and operation for processing upstream signals and downstream signals in the OLT 10 described with reference to FIGS. 3 and 4 respectively. As for each downstream signal, a downstream frame processing unit 2210 provided with a downstream route information DB 2211 for deciding processing including decision of a destination or conversion and attachment of header information based on the result of header analysis converts a GEM frame received from the PON section 80 into an Ethernet packet and supplies the Ethernet packet to a terminal connected to the ONU 20. As for each upstream signal, an upstream frame processing unit 2410 provided with an upstream route information DB 2411 converts an Ethernet packet received from a terminal into a GEM frame and outputs the GEM frame to the OLT 10

A PON control unit 2000 has a configuration including a downstream reception control unit 2070 and an ONU control unit 2060. The ONU control unit 2060 stores downstream signal transmission intensity schedule information (downstream light intensity map) into downstream light intensity map information 2071. The downstream signal transmission intensity schedule information is obtained as a result of frame processing in the downstream frame processing unit 2210. Based on the downstream signal transmission intensity schedule information, the ONU control unit 2060 controls an intensity control unit 2311 to make it possible to receive a downstream signal when the downstream signal is sent with light intensity proper for the ONU 20 to receive (or with lower light intensity), and otherwise to block or attenuate the light. The operation of the intensity control unit 2311 will be described in detail later. In addition, the ONU control unit 2060 serves for setting parameters at the start-up time of the ONU 20 or managing the communication condition in accordance with the instruction of the OLT 10. For example, processing in this block includes analysis of a received frame, management of maintenance/management information of the ONU 20, determination about necessity of communication (reply) to the OLT 10, etc.

Figure 6:
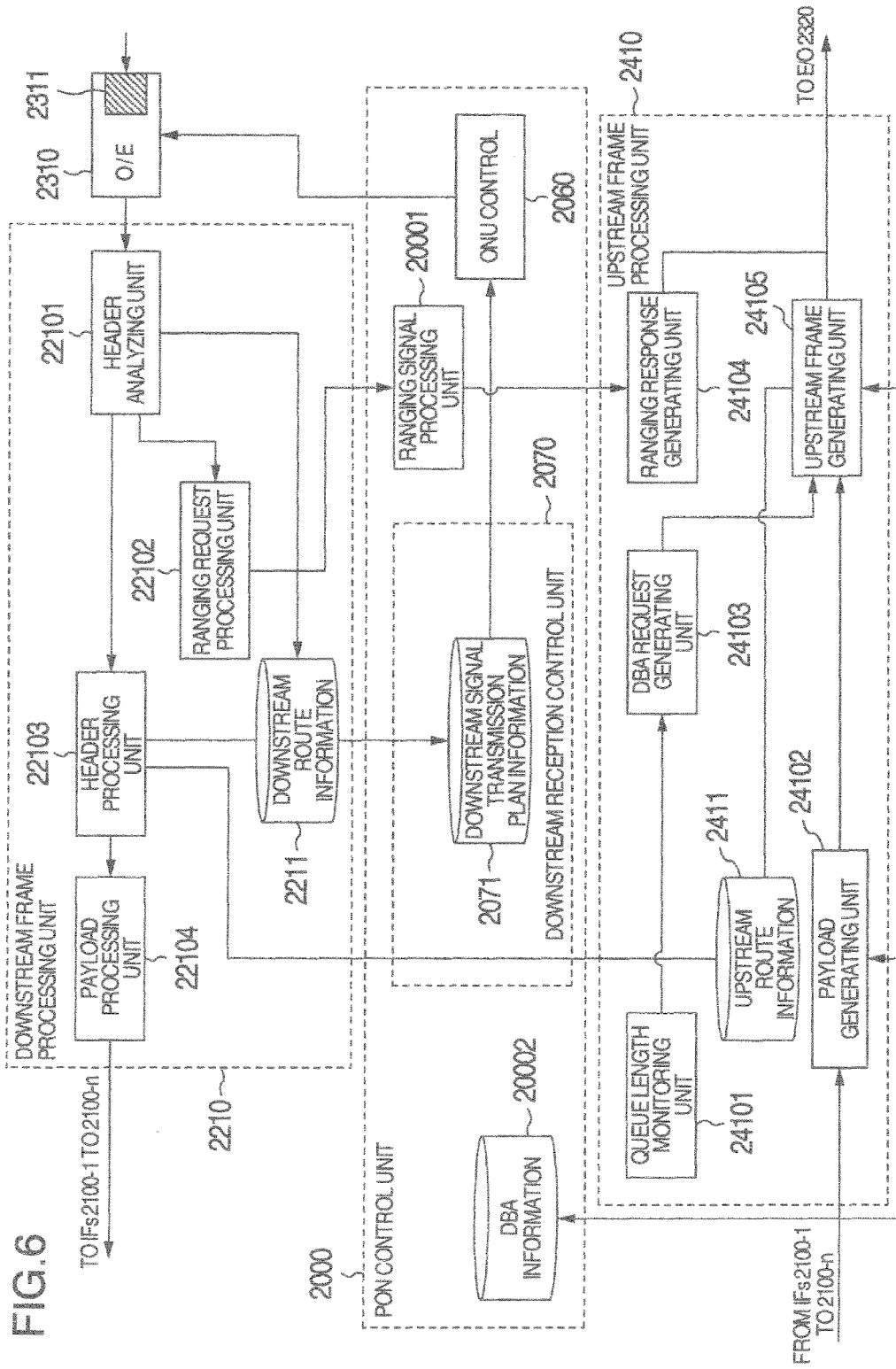
FIG. 6 is a functional block configuration diagram for explaining a flow of a signal in the ONU.

FIG. 6 is a functional block configuration diagram for explaining a flow of a signal in the ONU configuration example of FIG. 5. The downstream frame processing unit 2210 (1) determines whether the frame is addressed to the ONU 20 or not, and (2) checks the header information of the frame in a header analyzing unit 22101 of the downstream frame processing unit 2210 when the frame is addressed to the ONU 20. Here, information included in each downstream frame is roughly classified into two categories. One is a signal for PON section control, which should be terminated in the ONU 20. The other is a main signal frame such as user data which should be transferred to a device connected to the IF 2100-1 to 2100-*n* through the ONU 20.

Signal transmission/reception for the processing of ranging is a representative operation of the former. The header analyzing unit 22101 analyzes a received frame. On detecting that the frame is a ranging request from the OLT 10 to the ONU 20, the header analyzing unit 22101 transfers necessary information to a ranging request processing unit 22102. The ranging request processing unit 22102 records the reception time of the ranging request signal, generates an internal signal (response request notification) for sending a notification of the reception of the ranging request, and transfers the internal signal to a ranging signal processing unit 20001 together with the reception time. It is stipulated to send the reception time back to the OLT about 35 microseconds after the reception of the ranging request.

Processing for transferring user data in the downstream direction is a representative example of the latter. The user data is included in the payload part of a PON downstream frame in the form of one or a plurality of GEM frames. With reference to header information of each GEM frame, the header analyzing unit 22101 performs processing on the GEM frame when an identifier (hereinafter referred to as Port-ID) of the header information showing the ONU 20 itself is found in the GEM header. Specifically, a header processing unit 22103 converts the data format of each signal received as a GEM frame in order to transfer the signal to a device connected to the IF 2100-1 to 2100-*n* of the ONU 20. With reference to an address field (an Ethernet destination address or an IP destination address as a typical example) showing a destination of each data in the GEM header, the header processing unit 22103 decides an IF 2100 (specifically a physical address of the IF, an IF identifier used internally in the GNU 20, or the like (implementation-dependent)) to which the data should be sent out. For this IF decision, the header processing unit 22103 refers to the downstream route information DB (2211).

To transfer a signal from the downstream frame processing unit 2210 to the IF 2100, it is also necessary to change or add header information of a user data frame. For example, this is to change a VLAN tag value to be attached to an Ethernet frame or to insert a VLAN tag thereto. To this end, the downstream route information DB (2211) holds association between destination information of each frame and a destination IF identifier and header information conversion rules for the association. Based on the downstream route information DB 2211, header processing required in accordance with system setting is thus performed in the header processing unit 22103 so as to form a header format of each downstream frame for an external device. After that, in a payload processing unit 22104, a downstream frame format for transfer is constructed in combination with user data included in the payload part of the frame, and the frame is transferred to the IF 2100-1 to 2100-*n*.

The PON control unit 2000 includes a ranging signal processing unit 20001. On receiving a response request notification from the ranging request processing unit 22102, the ranging signal processing unit 20001 decides the time to send out a ranging response (which tune can be calculated practically using the number of internal clock ticks) based on the ranging request receipt time included in the notification, and sends out, to a ranging response generating unit 24104, an instruction to generate and send out a ranging response. Typically the ranging processing is carried out only at the start-up time of the ONU 20. However, the ranging processing may be carried out again, for example, when a communication failure such as abnormality in upstream signal synchronization is detected during operation. On such an occasion, the ranging processing unit 20001 of the PON control unit 2000 gives notification to the upstream frame control unit to suspend sending out any upstream user data frame during the transmission of a ranging response. FIG. 6 which explains processing in normal operation does not show a flow of a control signal at the time of a communication failure.

The upstream frame processing unit 2410 is provided with the ranging response generating unit 24104 to generate and send out a ranging response in accordance with an instruction from the ranging signal processing unit 20001. On this occasion, timing control is made to start sending out the ranging response to an E/O conversion unit 2320 at the time specified by the ranging signal processing unit.

Next, description will be made on processing when an ONU 20 receives a downstream signal in the configuration of FIG. 1. In a optical receiving device used in the ONU 20, upper limit values in the level of the S/N ratio of a signal the optical receiving device can identify, and in the light intensity at which the optical receiving device can receive light without being broken are predetermined. A downstream signal whose light has been normally received in an O/E unit 2310 and whose header has been recognized by the header analyzing unit 22101 is held in a frame buffer (not shown) provided in the downstream frame processing unit 2210 when the signal is not a ranging request. The header information of the signal is analyzed in the header analyzing unit 22101. When the header analyzing unit 22101 detects a light intensity map addressed to the ONU 20 itself in this header analyzing process, the information is sent to the downstream light intensity map information DB 2071 and held therein. At that time, the header analyzing unit 22101 refers to the downstream route information DB (2211) to determine whether the light intensity map is addressed to the ONU 20 or not. Specifically, the header analyzing unit 22101 refers to a PLOAM field 5130 (FIG. 12A) included in the downstream signal. When an ONU-ID identical to that of the ONU 20 is stored in the PLOAM field 5130, a transmission plan of the downstream signal stored in a downstream signal transmission plan 5150 is held in the downstream light intensity map information DB 2071.

The timing when the ONU 20 should receive a downstream signal is written in the downstream light intensity map information DB 2071 in terms of time or the number of clock ticks (bytes). With reference to the downstream light intensity map information DB 2071, the ONU control unit 2060 gives an instruction of downstream signal optically receiving timing to the intensity control unit 2311 provided in the O/E unit 2310. In accordance with the instruction, the intensity control unit 2310 opens or closes the intensity control unit 2311. Thus, the ONU 20 can be prevented from damaging an optical device of the O/E unit 2310 or from issuing an unnecessary communication abnormality alarm when the ONU 20 receives a signal whose frame is addressed to another ONU than the ONU 20 and whose S/N ratio is low.

Next, description will be made on processing of an upstream signal in each ONU 20. A signal received through each IF 2100-1 to 2100-n is once accumulated in the ONU 20 and then transferred to the OLT 10 in accordance with an upstream frame transmission timing, specified by the OLT 10. The procedure to arrange an upstream signal is divided into header information processing and payload information processing in the same manner as the analysis of a downstream signal. Information inputted as an upstream signal is once accumulated in a frame buffer (not shown) provided in the upstream frame processing unit 2410. Of the information, a payload part is transmitted, divided or coupled to form a payload of a GEM frame in a payload generating unit 24102. Processing in this stage depends on an upstream signal sending bandwidth (which can be converted into the number of bytes) specified by the OLT.

On the other hand, two stages of processing are performed on the header information. In the first stage, processing is performed to form a GEM header of an upstream signal received from the IF 2100. An upstream frame generating unit 24105 inserts a Port-ID assigned to the ONU 20 in advance as an identifier of the ONU 20 to the GEM header. The upstream frame generating unit 24105 refers to the upstream route information DB 2411 to decide the Port-ID. In addition, when an upstream frame is to be formed, a DBA request generating unit 24103 creates an upstream bandwidth request called a DBA report. The DBA report is sent from the ONU 20 to the OLT 10. The information is stored in a header of the upstream frame by an upstream frame generating unit 24105. Specifically, the upstream bandwidth request is information for notifying the OLT 10 of the accumulated amount of data in an upstream signal transmission queue in the ONU 20 so as to receive transmission permission from the OLT 10 in accordance with the amount of the data. In the upstream frame generating unit 24105, upstream signal header information including the upstream bandwidth request is couple with a payload generated by the payload generating unit 24102. Thus, an upstream frame is completed. After that, when upstream signal transmission permission is received from the OLT 10, the ONU 20 stores timing information for transmitting an upstream signal. The timing information is included in the transmission permission. The ONU 20 sends out upstream data through the E/O unit 2320 in accordance with the stored timing.

Figure 7:
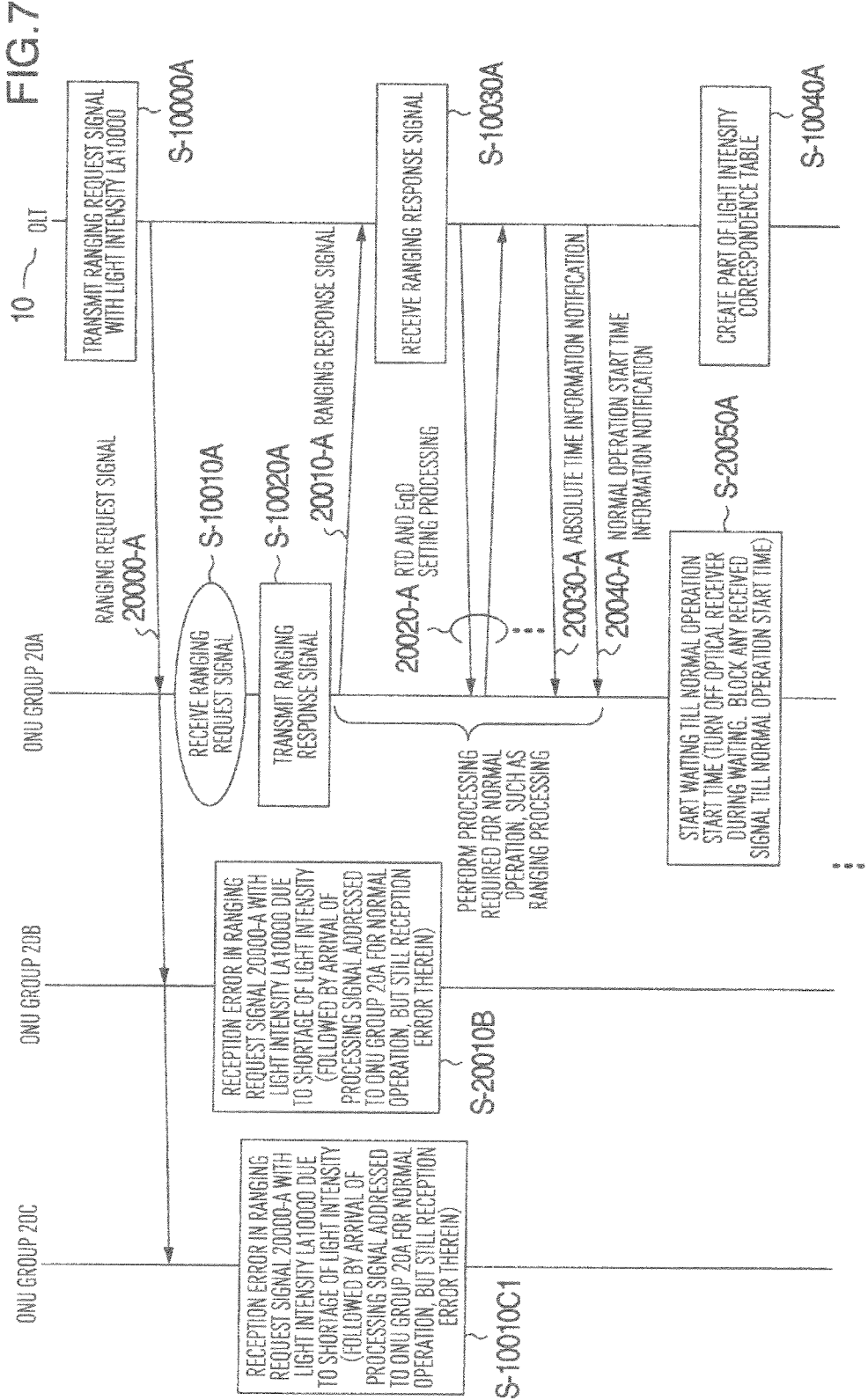
FIG. 7 is a sequence chart showing an example of a ranging operation carried out between the OLT and an ONU group 20A.

FIG. 7 is a sequence chart showing the ranging operation to be carried out between the OLT 10 and each ONU belonging to the ONU group 20A at the start-up time of the PON system. Here, description will be made on the assumption of a start-up process in the state where the OLT 10 does not grasp the distance between the OLT 10 and each ONU 20 at the beginning of operation, as shown in ITU-T Recommendation G984.3.

After the start-up, the OLT 10 transmits a ranging request signal to each ONU 20. At that time the OLT 10 does not know where each ONU 20 is placed, that is, how far each ONU 20 is placed. Therefore, the ranging processing unit 1063 of the OLT 10 first transmits ranging request signal 20000-A with minimum light intensity LA10000 to each ONU 20 (S-1000A). On this occasion, depending on the distance between the OLT 10 and each ONU 20 or the influence of transmission loss, the ONU 20 can properly receive the ranging request signal 20000-A transmitted with the minimum light intensity LA10000, or the receiving sensitivity of the O/E 2310 mounted on the ONU 20 is too poor to receive the ranging request signal 20000-A due to an error signal or the like. In this embodiment, assume that each ONU of the ONU group 20A can receive the ranging request signal 20000-A (S-10010A), but any other ONU of the ONU groups 20B and 20C cannot receive the ranging request signal 20000-A (S-10010B and S-10010C1).

Each ONU of the ONU group 20A which can receive the ranging request signal 20000-A transmits a ranging response signal 20010-A to the OLT 10 (S-10020A). The PON control unit 1000 of the OLT 10 receiving the ranging response signal 20010-A determines that communication with the ONUs of the ONU group 20A each transmitting the ranging response signal 20010-A can be made with the optical signal intensity LA10000, and performs ranging processing according to ITU-T Recommendation G984.3. For example, the PON control unit 1000 measures a round-trip delay time RTD between the OLT 10 and each ONU belonging to the ONU group 20A individually with the optical signal intensity LA10000, and decides the value of an equivalent delay EqD based on the measuring result (20020-A).

On this occasion, the ranging processing unit 1063 of the OLT 10 measures communication time between the OLT 10 and each ONU 20 based on the result of the ranging processing. The communication time obtained thus can serve for setting an absolute time managed by the OLT 10 for each ONU 20 (20030-A). In this embodiment, the intensity control unit 2311 of the ONU 20 is opened/closed at the timing when the PON control unit 1000 of the OLT 10 gives notification thereto. It is therefore necessary to secure temporal synchronization between the OLT 10 and the ONU 20. To this end, the OLT 10 sends and sets an absolute time to the ONU 20. Each ONU uses the absolute time to properly recognize information about the arrival time of a frame addressed to the ONU, which time is indicated in a light intensity map as will be described in detail later. Each ONU 20 can thus obtain information about the time which should be set in the ONU 20 itself based on the time information (absolute time) managed on the OLT 10 side. Thus, the boundary time between cycles of a basic frame from the OLT 10 or the time when the frame will reach each ONU can be set in the ONU. To set the absolute time, a method, for example, disclosed in JP-A-2009-65443 can be used, but this embodiment is not limited to the method.

The PON control unit 1000 of the OLT 10 gives notification to each ONU belonging to the ONU group 20A which has communicated with the OLT 10 till then, so as to set the intensity control unit 2311 in the ONU belong to the ONU group 20A to start its receiving operation at the predetermined start time of normal operation and block or attenuate all the signals received by the ONU till then (20040-A and 20050-A). Then, the ranging processing unit 1063 of the OLT 10 creates a part of the light intensity correspondence table 1064 about the ONUs belonging to the ONU group 20A. In the light intensity correspondence table 1064, information for identifying each ONU 20 uniquely is associated with information about the distance between the ONU 20 and the OLT 10 obtained as a result of the ranging processing and the light intensity required for communication (S-10040A).

Figure 8:
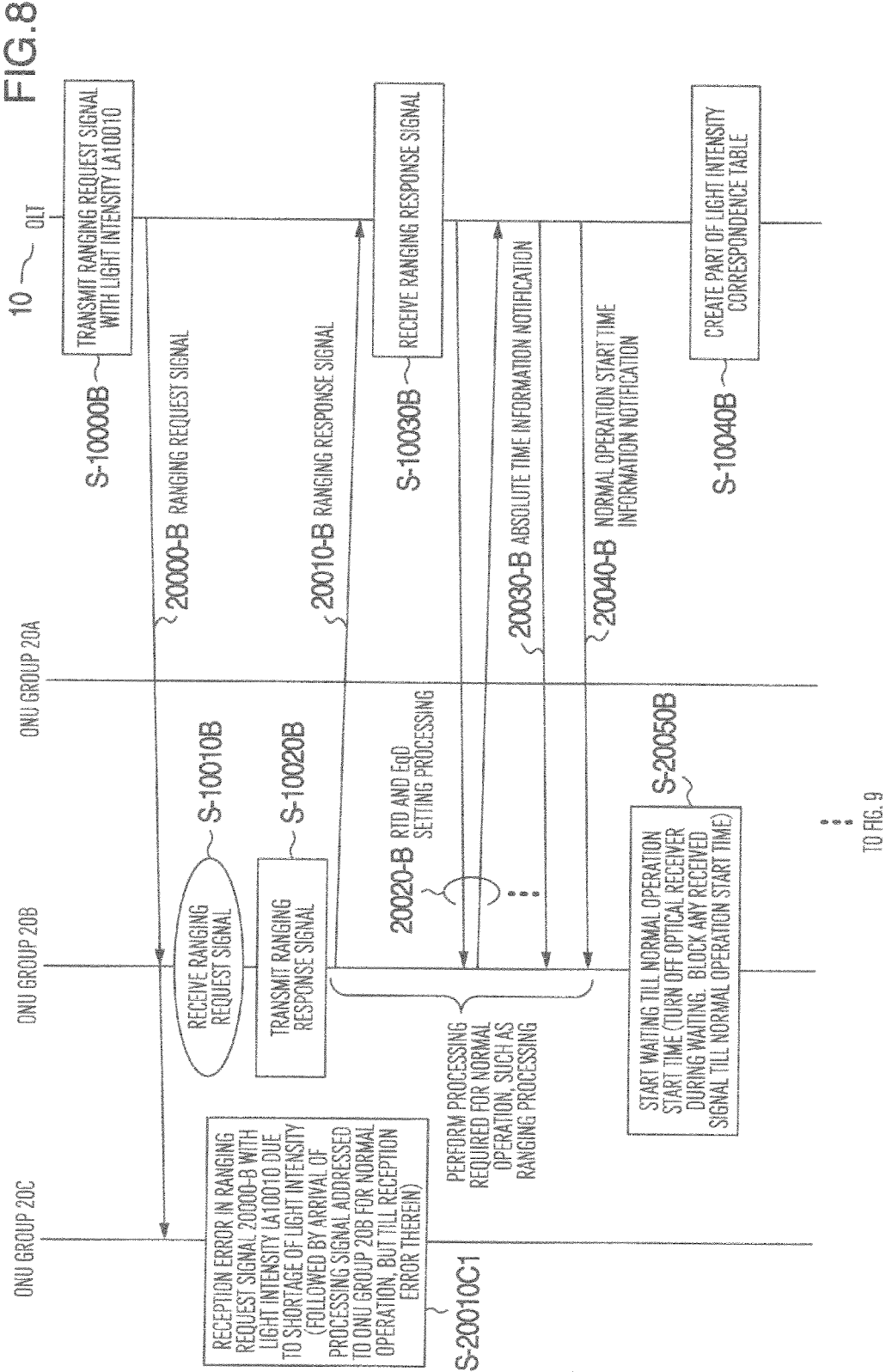
FIG. 8 is a sequence chart showing an example of a ranging operation carried out between the OLT and an ONU group 20B.

FIG. 8 is a sequence chart showing a ranging operation to be carried out between the OLT 10 and each ONU belonging to the ONU group 20B at the start-up time of the PON system. Each ONU of the ONU groups 20B and 20C which failed in properly receiving the ranging request signal transmitted with the minimum light intensity signal LA10000 shown in FIG. 7 due to the distance between the OLT and the ONU or the transmission loss keeps waiting for a ranging request signal from the OLT 10.

The OLT 10 which has finished performing the ranging processing and defining the absolute time for each ONU using the aforementioned signal with the light intensity LA10000 then changes the light intensity from the light intensity LA10000 to one step higher light intensity LA10010, and transmits a ranging request signal 20000-B again to each ONU 20 (S-10000B). In this process, the ranging processing unit 1063 may gives the optical gain deciding unit 1092 an instruction to increase the light intensity to be one step higher, and the optical gain deciding unit 1092 may informs a transmission light intensity acquiring unit 12106 of the intensity of an optical signal to be transmitted. Alternatively, the light intensity control unit 1090 receiving an instruction from the ranging processing unit 1063 may give an instruction directly to the intensity control unit 11000.

The signal with the light intensity LA10010 one step higher than the light intensity LA10000 reaches each ONU of the ONU group 20A which has already finished the ranging processing. Thus, there may arise a problem that the optical receiver of the ONU is damaged or broken. However, since an instruction to block or attenuate all the signals received till the predetermined start time of normal operation has been given from the OLT 10 to the ONU, the ONU blocks the signal with the light intensity LA10010 arriving this time so as to protect the optical receiver of the ONU (20050-A) therefrom. On the other hand, in each ONU of the ONU group 20C, the receiving sensitivity of the O/E 2310 mounted on the ONU is too poor to receive the ranging request signal 20000-B due to an error signal or the like, in the same manner as previously.

However, each ONU of the ONU group ONU can recognize the ranging request signal 20000-B though the signal is transmitted with the light intensity LA10010. Thus, the ranging processing and the absolute time information setting are performed between the ONU and the OLT 10. The contents of those processings at this time are the same as the aforementioned processings performed with the light intensity LA10000 between the OLT 10 and each ONU 20, and description thereof will be omitted. After that, the PON control unit 1000 of the OLT 10 gives notification to each ONU 20 belonging to the ONU group 20B so as to set the intensity control unit 2311 in the ONU 20 belonging to the ONU group 20B to block or attenuate all the signals received by the ONU 20B till the predetermined start time of normal operation (20040-B). Then, the ranging processing unit 1063 creates a part of the light intensity correspondence table 1064 about the ONUs belonging to the ONU group 20B (S-10040B).

Figure 9:
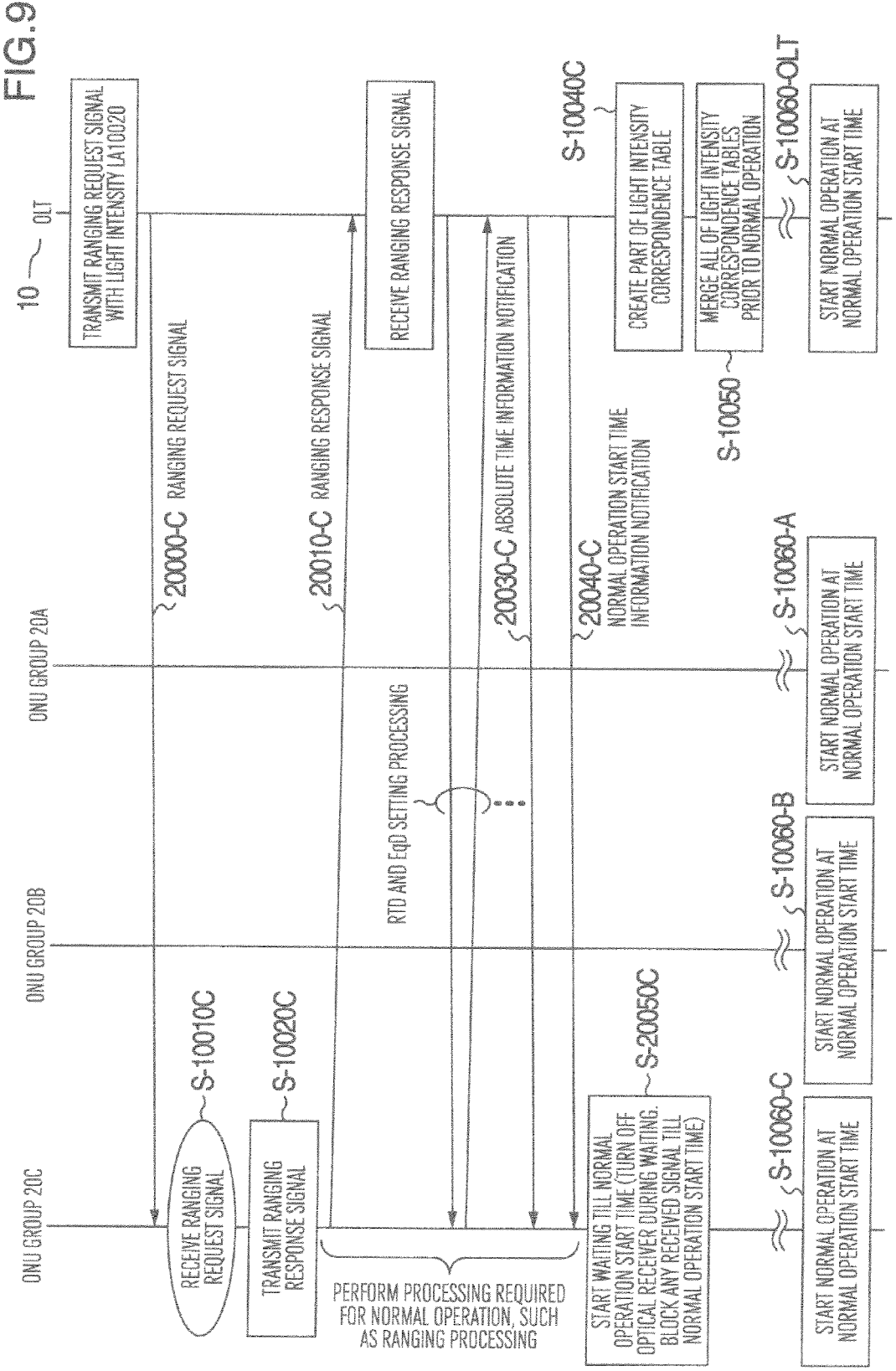
FIG. 9 is a sequence chart showing an example of a ranging operation carried out between the OLT and an ONU group 20C.

FIG. 9 shows the procedure of ranging processing carried out for the ONU group 20C after the completion of the ranging processing for the ONU groups 20A and 20B shown in FIGS. 7 and 8. The OLT 10 which has finished the process shown in FIG. 8 with the light intensity LA10010 transmits a ranging request signal with further higher light intensity LA10020 so as to perform a process similar to the aforementioned one with each ONU of the ONU group 20C returning a ranging response signal. The signal with the light intensity LA10020 is too intensive for each ONU of the ONU groups 20A and 20B. Thus, also at this time, each ONU of the ONU groups 20A and 20B blocks or attenuates the received signal in accordance with the instruction from the OLT 10 so as to prevent any problem from occurring, for example, prevent the optical receiver of the ONU from being damaged or broken. In this manner, the OLT 10 performs ranging processing and gives notification of absolute time while increasing the intensity of an optical signal gradually. Thus, the OLT 10 can perform the ranging processing and the absolute time setting on all the ONUs 20 serving under the OLT 10. Finally, the OLT 10 and all the ONUs 20 move to normal operation (S-10060-OLT, S-1006-A, S-10060-B and S-10060-C).

When the sequence of ranging processing has been finished, the ranging processing unit of the OLT 10 merges the light intensity correspondence tables 1064 created for the ONU groups 20 into one table (S-10050).

Figure 14:
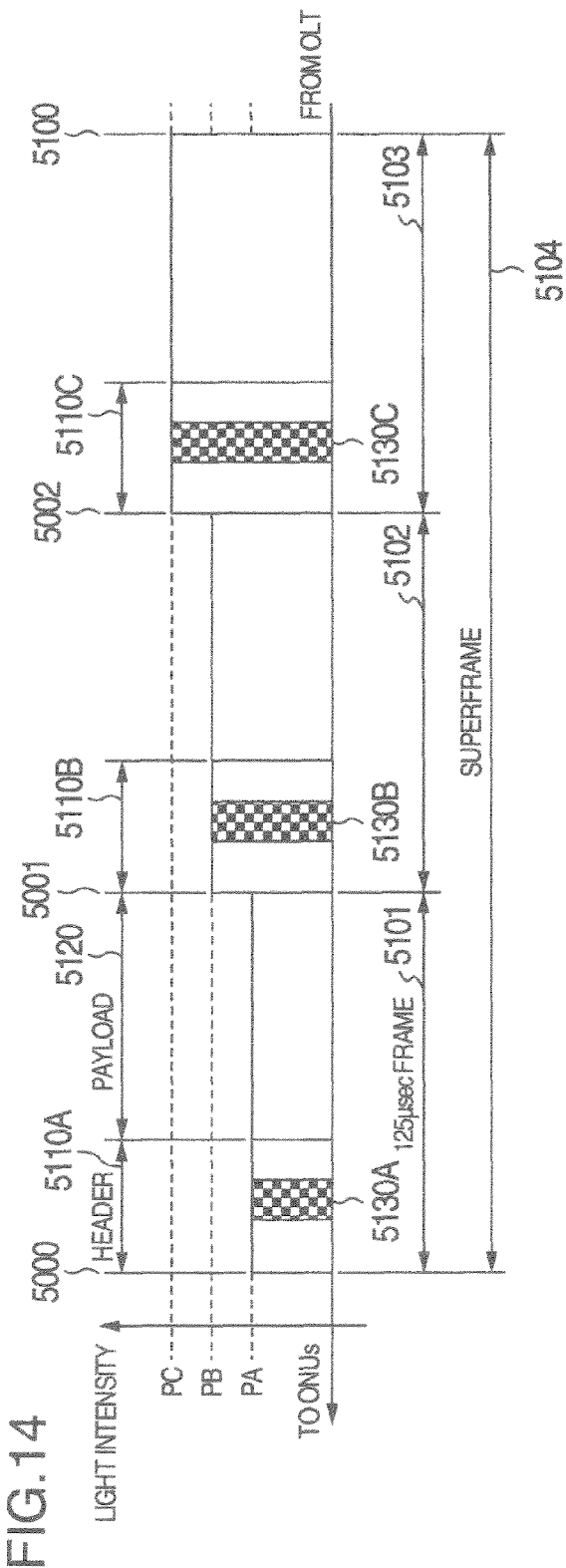
FIG. 14 is a diagram for explaining a configuration example of the superframe.

When the OLT 10 specifies, as a normal operation start time for each ONU 20, the time when a signal with a light level corresponding to the ONU 20 will first reach the ONU 20, the ONU 20 can receive a downstream frame arriving immediately after the start of normal operation, without any error or failure. For example, in an example of FIG. 14 which will be described later, the normal operation start time corresponds to a time 5000 for the ONU group 20A, a time 5001 for the ONU group 20B and a time 5002 for the ONU group 20C when a superframe 5104 in FIG. 14 is first transmitted after the start of operation.

In addition, 2.5 Gbps corresponding to the communication bit rate of current GPON is assumed as the communication bit rate in this embodiment. However, in a system in which the OLT 10 can support both the communication bit rates 2.5 Gbps and 10 Gbps and ONUs supporting the communication bit rate of 2.5 Gbps and ONUs supporting the communication bit rate of 10 Gbps are mixed among the ONUs 20 serving under the OLT 10, the aforementioned processing operation with each light level may be performed with the communication bit rate of 10 Gbps after the operation is performed with the communication bit rate of 2.5 Gbps. Specifically, the processing shown in FIG. 7 is first performed with the light intensity LA 10000 and the communication bit rate of 2.5 Gbps. After that, the communication bit rate is changed to 10 Gbps, and the processing is performed again. In a system with a high communication bit rate, the signal attenuation and the wavelength dispersion on an optical fiber are more violent than in a system with a low communication bit rate in view of optical transmission characteristics. It is therefore necessary for the OLT 10 to transmit a signal with higher intensity in the system with the high communication bit rate. For example, assume that transmission of one and the same distance is performed with 2.5 Gbps and 10 Gbps. In this case, the difference in light intensity between the transmission side and the reception side reaches about 16 times theoretically. Therefore, when ONUs supporting 2.5 Gbps are first started up, ONUs supporting the communication bit rate 2.5 Gbps and ONUs supporting the communication bit rate 10 Gbps which ONUs can be dealt with by the light intensity LA10000 can be moved to normal operation. After that, the aforementioned processing may be performed with the light intensity changed from the light intensity LA10000 to the light intensity LA10010 and the light intensity LA10020 in the same manner as all the ONUs 20 serving under the OLT 10 support the communication bit rate of 2.5 Gbps. Here, description has been made on the assumption that the communication bit rate of the next-generation standard GPON is 10 Gbps. This is only an example but the communication bit rate of the next-generation standard GPON is not limited to 10 Gbps. The description has been made as a model in which PON system with different communication bit rates are mixed and accommodated.

In this embodiment, the OLT 10 increases the light intensity of a transmitted downstream signal gradually to perform ranging ONUs 20 sequentially in order of increasing distance from the OLT 10. On this occasion, there are roughly two methods for allowing the OLT 10 to recognize the completion of ranging processing on an ONU group at a certain distance. One is a method in which a list of serial numbers (SNs) set in advance when ONUs are connected (ONUs are distributed to users) is held inside the OLT 10, and the OLT 10 checks whether all the ONUs corresponding to the SNs of the list prepared in each connection distance have been completely started up or not. The other is a method in which the OLT 10 performs a sequence of start-up processing periodically and knows, through polling, whether there is an ONU 20 connected newly or not. In this method, the OLT 10 performs polling sequentially on all the SNs (excluding those of ONUs which have been connected) while changing the SN bit by bit to target ONUs of each group one by one (in this case, the OLT 10 does not know the list of SNs in advance), for example, when the ONU groups 20A to 20C are started up. Alternatively, a method in which the OLT 10 checks the ONU group 20B after completing the polling on all the SNs of the ONU group 20A may be used.

Figure 10:
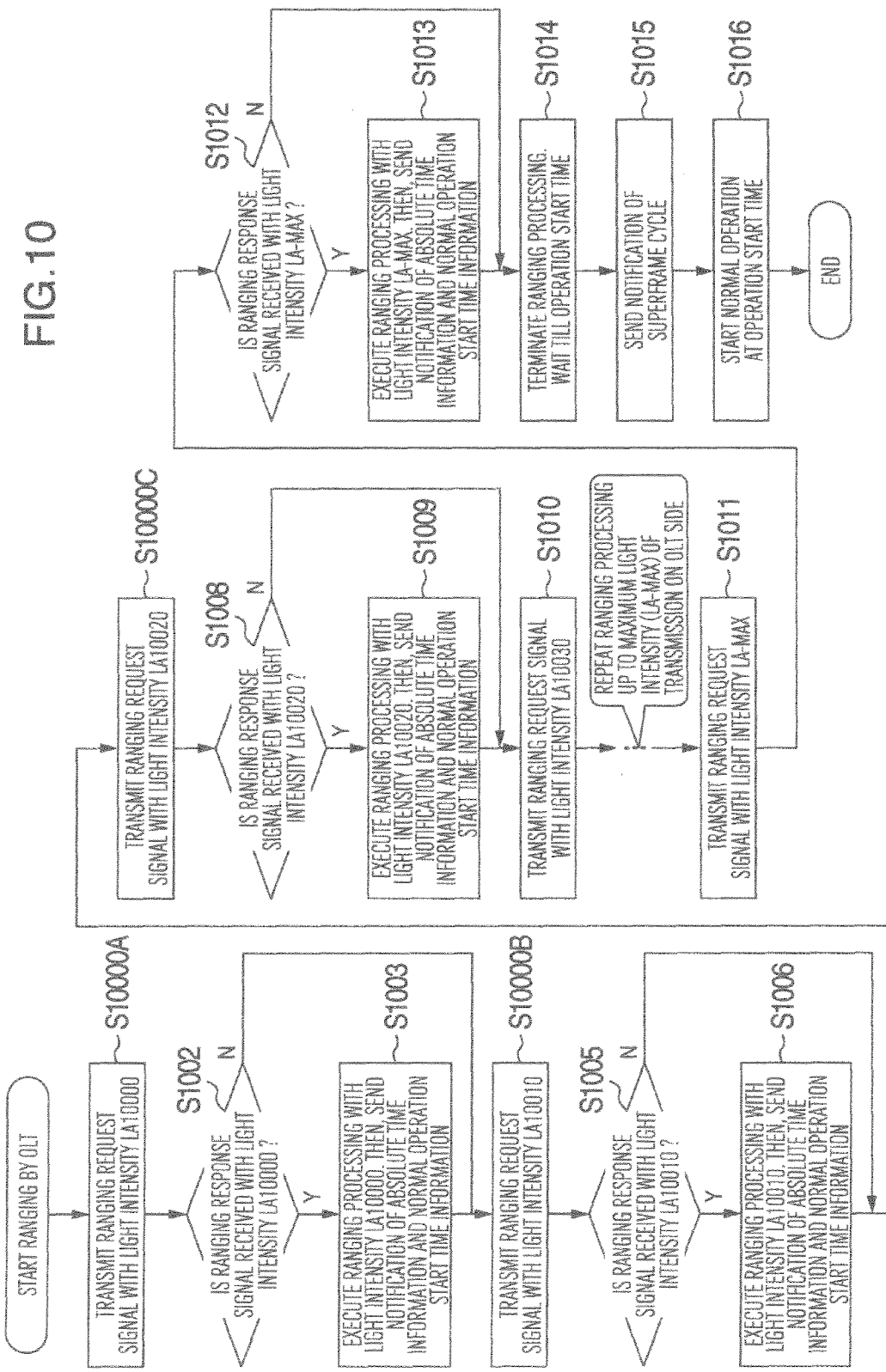
FIG. 10 is a flow chart showing an example of a ranging operation procedure in an OLT 10.

FIG. 10 is a flow chart showing the procedure of operation of the OLT 10 in the sequence of FIGS. 7 to 9. In this flow chart, steps S-10000A to S1003 correspond to FIG. 7. In the same manner, steps S-10000B to S1006 correspond to the sequence processing of FIG. 8, and steps S-10000C to S1009 correspond to the sequence processing of FIG. 9. In particular, the step S1002 is a confirmation step to be executed by the OLT 10 between S-10000A and the ranging response signal reception S-10030A in FIG. 7. When it is confirmed as a result of the step S1002 that a ranging response has been received properly, the OLT 10 performs a sequence of ONU setting processing from the step 20020-A to the step S10040A. The sequence of processing is collectively expressed as the step S1003 in FIG. 10.

FIG. 10 corresponds to FIG. 8 and FIG. 9 in the same manner. The step S1005 is a confirmation step to be executed by the OLT 10 between S-10000B and the ranging response signal reception S-10030B in FIG. 8. When it is confirmed as a result of the step S1005 that a ranging response has been received properly, the OLT 10 performs a sequence of ONU setting processing from the step 20020-B to the step S10040B. The sequence of ONU setting processing corresponds to FIG. 9 in the same manner. Therefore, the correspondence will not be described.

In this manner, start-up processing is performed on the ONU groups 20A, 20B and 20C sequentially in order of increasing distance from the OLT 10. When the ranging processing on the ONU group which is the farthest from the OLT 10 is finished, this flow is completed. The step S1010 in FIG. 10 is a step for starting the ranging processing on an ONU group which is the farthest next to the ONU group 20C. The steps S1011 to S1013 correspond to the ranging processing on the ONU group which is the farthest. After that, the OLT 10 confirms the termination of the ranging processing while each ONU 20 waits till the operation start time specified by the OLT 10 (S1014).

When each ONU 20 is waiting thus, the OLT 10 notifies the ONU 20 of a transmission cycle of superframes (S1015). Each superframe in this embodiment is a frame which includes a 125-microsecond basic frame for each of the ONU groups 20A, 20B and 20C and is a frame totally 375 microseconds long with those three basic frames being coupled. The superframe cycle corresponds to a temporal interval with which the OLT 10 sends out such superframes periodically. When each ONU 20 knows the superframe cycle, the ONU 20 which has received the first superframe after the operation start time can know the timing when the ONU 20 will receive the next superframe. The superframe cycle can be set desirably if the superframe cycle is longer than the length of each superframe. The timing when the OLT 10 notifies each ONU 20 of the superframe cycle is not limited to the time when the ONU 20 is waiting, but may be set at any time before the start of normal operation. Each ONU 20 stores the sent operation start time and the sent superframe cycle into the downstream light intensity map information 2071.

The ONU 10 and each OLT 20 start their operations at their operation start time respectively (S1016). The OLT 10 must set a time when ranging processing for all the ONUS 20 has been terminated, as the operation start time of the ONU group 20A. It may be assumed that the OLT 10 does not grasp beforehand when ranging processing will be terminated and when operation can be started. For example, it may be assumed that the OLT 10 performs the ranging processing with the intensity of an optical signal increasing stepwise till the OLT 10 cannot receive a ranging response signal from any ONU 20. In such a case, for example, a measure to secure an enough time between the start time of a sequence of ranging processing and the start time of the operation of the ONU group 20A may be taken to prevent the operation of the ONU group 20A from starting during the ranging processing.

FIG. 11 shows a configuration example of the light intensity correspondence table 1064 created and held in the OLT 10 as a result of the start-up processing of the ONU 20 shown in FIGS. 7 to 9. FIG. 11 is a table created by the OLT in the step S-10050 (FIG. 9) as a result of the ranging processing described in FIGS. 7 to 9, which table is held by the ranging/DBA information DB 1061 in the OLT 10. The table holds information where an ONU-ID 30000 which is an identifier of each ONU 20, distance information 30010 about the distance between the ONU 20 and the OLT 10, and light intensity 30020 required for communication therebetween are associated with one another. As described above, the ranging processing unit 1063 creates a light intensity correspondence table 1064 whenever ranging with each light intensity is completed (S-10040A, S-10040B, S-10040C). The ranging processing unit 1063 can finally merge those tables to create table information about all the ONU (S-10050). In addition, if PON systems with different communication bit rates are mixed and accommodated as described previously, communication bit rate information 30030 for communication may be added to each table when the table is created with each light intensity.

From this table information, for example, it can be known that downstream frames in normal operation may be transmitted with the light intensity LA10000 to each ONU that is successful in the ranging processing performed first with the light intensity LA10000, and downstream frames in normal operation may be transmitted with the light intensity LA10010 to each ONU that is successful the ranging processing performed with the increased light intensity LA10010.

FIGS. 12A-12D are signal configuration diagrams showing a configuration example of a downstream light intensity map which can achieve transmission/reception of downstream variable-intensity signals shown in FIG. 2 in the optical access system of FIG. 1. In order to avoid failures in optical receiving devices and in order to avoid unnecessary error messages issued from ONUs which are not intended to receive signals, the OLT 10 sends a downstream light intensity map to each ONU 20 to notify the ONU 20 of the timing when the OLT 10 will transmit a downstream signal. This notification is information all the ONUs 20 should know in advance before starting their operations. For example, the ONU group 20A must also grasp the transmission timing of downstream signal data to be transmitted to the ONU group 20C. On the other hand, the ONU group 20C must also grasp the transmission timing of a downstream signal S107 to be transmitted to the ONU group 20A. That is, the downstream light intensity map of downstream frames must be designed so that all the ONUs 20 can grasp the contents of the downstream light intensity map.

FIGS. 12A-12D show a configuration example of the map. According to GPON (ITU-T Recommendation G.984.3) as an example, in a head of each signal addressed to each ONU 20 from the OLT 10, a frame synchronization pattern 90000 for identifying the head of the signal, a PLOAM (Physical Layer Operation, Administration and Management) field 5130 for transmitting information about surveillance, maintenance and control, and a header (also referred to as overhead) called a grant designation field 90010 for designating signal transmission timing to each ONU are attached to time-division multiplexed data 5120 (also referred to as payload) addressed to the ONU in this embodiment, the OLT 10 puts optical signal reception timing information of each ONU 20 in the PLOAM field.

In FIG. 12B, a control frame identifier 5131 includes an identifier indicating that the PLOAM message is a uniquely set message including "light intensity information". For example, an empty ID which can be used in vender's own right may be used as the identifier. Here, "11000000" is used by way of example. A downstream signal transmission plan 5150 is inserted into a message field 5132 in the PLOAM. The downstream signal transmission plan 5150 includes a temporal interval between the reception time of the head of the downstream frame header, that is, the time shown as the reference numeral 5000 in FIG. 14, and the arrival time of the downstream frame to be received by the ONU 20. The downstream signal transmission plan unit 12107 creates the downstream signal transmission plan 5150.

In this embodiment, each superframe has a fixed length, and each basic frame for each ONU group included in the superframe also has a fixed length of 125 microseconds. Accordingly, reception start time 5152 for the ONU group 20A is fixedly set as zero, reception start time 5152 for the ONU group 20B is fixedly set as 125 microseconds or the number of bytes corresponding thereto, and reception start time 5152 for the ONU group 20C is fixedly set as 250 microseconds or the number of bytes corresponding thereto. Thus, in this embodiment, for example, the OLT 10 notifies each ONU belonging to the ONU groups 20A-20C of the superframe cycle (S1015) so as to notify each ONU belonging to the ONU group 20A of zero as the reception start time of a basic frame in a superframe, each ONU belonging to the ONU group 20B of 125 microseconds likewise, and each ONU belonging to the ONU group 20C of 250 microseconds likewise. In this manner, it is not necessary for the OLT 10 to mount the downstream signal transmission plan 5132 on a header whenever the OLT 10 transmits a superframe. In the same manner, reception end time 5163 of each ONU belonging to each ONU group 20A-20C is also fixed. The reception end time 5163 is 125 microseconds for each ONU belonging to the ONU group 20A, 250 microseconds for each ONU belonging to the ONU group 20B, and 375 microseconds for each ONU belonging to the ONU group 20C.

In fact, pieces of light intensity information 5161, 5171 and 5181 included in the illustrated example may be omitted. It will go well only if the OLT 10 grasps proper light intensity to be used for transmitting data to each ONU 20 as a destination of a downstream signal, and the ONU 20 simply knows the timing when the ONU 20 itself will receive the signal.

In addition, time based on absolute time set for each ONU 20 by the OLT 10 in the ranging processing in FIGS. 7 to 9 is stored in the signal reception start time 5152-12 or the reception end time 5153-13 for each ONU 20 described here. That is, the OLT 10 and each ONU 20 perform various processings, represented by frame processing, using common temporal information. In addition, when the OLT 10 and each ONU 20 share a mutual temporal reference in the form of the aforementioned absolute time, any later processing needing temporal information may be performed with information of relative time to the temporal reference.

Figure 13:
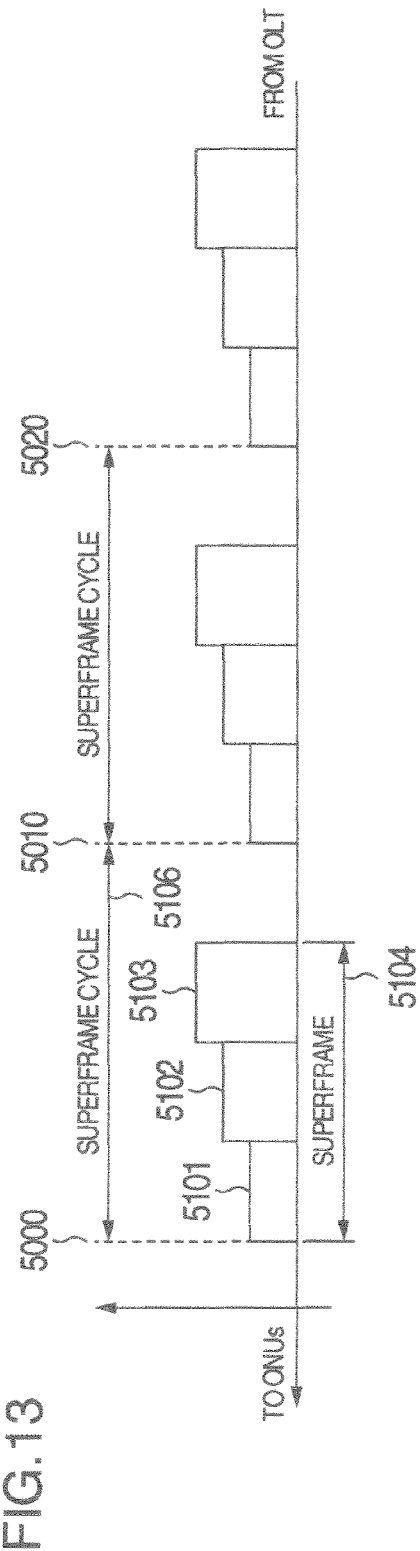
FIG. 13 is a chart for explaining a state in which a superframe is transmitted periodically.

FIG. 13 is a signal configuration chart showing a configuration example of a downstream frame for achieving transmission/reception of the downstream variable intensity signal shown in FIG. 2 in the PON 1 shown in FIG. 1. In FIG. 13, it is assumed that three ONU groups (20A, 20B and 20C) with different distances are formed as shown in FIG. 1.

FIG. 13 shows a method in which the transmission intensity of a downstream frame to be transmitted to each ONU group is changed stepwise in 125-microsecond basic frame units in accordance with the PON basic cycle. That is, the OLT 10 sends out downstream signals each as a frame 5104 always having a set of three 125-microsecond frames 5101, 5102 and 5103 coupled with one another as shown in FIG. 13. Each ONU 20 performs standard frame synchronization processing on each 125-microsecond basic frame, and identifies the first frame of three basic frames coupled as one unit. The first frame corresponds to the start position of the coupled frames. The start position corresponds to the time shown as the time 5000 in FIG. 13. The three coupled frames in this embodiment will be referred to as superframe 5104.

FIG. 14 shows a case where one cycle of the superframe 5104 corresponds to three basic frames. The superframe 5104 is a means for defining a frame form sequence in which the frames 5101, 5102 and 5103 with a basic cycle are bundled as a frame with a longer cycle.

The transmission intensity varies according to each 125-microsecond basic frame (5101, 5102 or 5103). Whether each ONU 20 can receive a basic frame or not depends on the basic frame. Therefore, for example, each ONU belonging to the ONU group 20B must identify the time shown by the reference numeral 5001, which time corresponds to the header start position of the basic frame 5102 transmitted with middle intensity. Each ONU 20 determines the start timing of a basic frame the ONU 20 should receive, based on the relative position of the basic frame in the superframe, that is, the order of arrival thereof. Specifically, as described above, synchronization is secured between the OLT 10 and each ONU 20 using absolute time. Each ONU 20 is notified of a superframe cycle 5106 by the OLT 10 in advance. Therefore, each ONU 20 adds the superframe cycle to its operation start time (the time 5000 in FIG. 13) in turn so that the ONU 20 can know the reception time (5010 or 5020 in FIG. 13) of each superframe 5104 on or after the next time. Each ONU 20 that knows the reception start time of each superframe 5104 adds a multiple of 125 microseconds, which is the basic frame cycle, to the reception start time so that the ONU 20 can know the timing when the ONU group 20A-20C the ONU 20 belongs to should receive each basic frame.

In this manner, frames on light levels consist of the basic frames 5101, 5102 and 5103 whose frame lengths are fixed to 125 microseconds in accordance with the PON basic cycle, and each superframe 5104 is defined as the aforementioned basic frames combined in order of light intensity (PA, PB, PC). Thus, each ONU 20 can know the timing when a frame with a light level the ONU 20 can receive will arrive at the ONU 20. That is, a downstream signal transmission plan 5150 for each ONU group 20 built in each header 5110A, 5110B, 5110C reaches the ONU group 20 in a fixed cycle. Thus, each ONU 20 can grasp the timing when a header the ONU 20 should receive will be transmitted from the OLT 10.

In this manner, this embodiment is characterized in that a superframe cycle (corresponding to the interval between the time 5000 and the time 5100 in FIG. 14) in which a plurality of 125-microsecond frames each as a basic cycle are bundled is introduced for transmitting a downstream signal from the OLT 10 to each ONU 20. When the superframe 5104 is formed, existing technologies can be applied to processing for each basic frame. Accordingly, the development cost can be reduced as compared with a case where the 125-microsecond basic frame configuration is changed. In addition, the OLT 10 notifies each ONU 20 of the start point of the superframe, that is, the operation start time 5000 and the cycle 5106 in advance, and further notifies the ONU 20 of the reception frame position in the superframe 5104 in 125-microsecond units. Thus, each downstream frame can be transmitted/received based on background-art PON rules.

The relative position of a frame to be received in a superframe, that is, which basic frame in order of distance from the start position 5000 of the superframe 5104 should serve as an end is set in the following method by way of example. When each ONU 20 is started up, which ONU group (20A-20C) the ONU 20 belongs to can be recognized with certain precision by an operator, for example, if the position of the second splitter 31A-31C the ONU 20 should be connected to (the distance from the OLT 10) is determined beforehand. To this end, the operator may set the reception start position of a frame in a superframe for each ONU 20 in advance. Alternatively, the PON control unit of the OLT 10 may refer to the light intensity correspondence table 1064 and notify ONUs 20 of one group, to which a downstream signal will be transmitted with one and the same light intensity, of one and the same time as the reception start position of a frame in a superframe.

Each ONU 20 recognizes the reception start time 5000 of a superframe, the start times 5001 and 5002 of basic frames in the superframe and allows the downstream signal intensity control unit 2311 to receive an optical signal in sync with the arrival time of a basic frame the ONU 20 should receive. The timing when the header information of each frame arrives is immediately after the start of a 125-microsecond cycle. In addition, as to the signal intensity with which the header information will be transmitted, the transmission order of the signal intensity in the downstream superframe cycle is beforehand known (and the 1.25-microsecond frame length is fixed (the header part and the payload part of each frame may have variable lengths respectively, but the total length of the frame is fixed)). Thus, all the ONUs can receive control information without any special setting other than the initial settings including the superframe cycle and the boundary time between the superframe cycles.

As has been described until now, FIG. 14 shows a configuration example in which a frame is transmitted by 125-microsecond basic frame length, providing that the light intensity with which the header information 5110 and the downstream signal transmission plan 5150 included in the header information 5150 are transmitted is equal to the light intensity with which the payload part of the frame is transmitted. In this case, a downstream signal can be transmitted/received without necessity to send the light intensity information 5161, 5171, 5181 to each ONU 20. Each ONU 20 uses the start point 5000 of the superframe 5104 as a base point to control the reception light intensity control unit 2311 so as to repeatedly receive and block the downstream signal with intensity differing from one basic frame to another in the superframe.

In this embodiment, an ONU-ID 7001 of the PLOAM message is used as an ONU identifier designated by the downstream signal transmission plan 5150. That is, of the ONUs belonging to the ONU group 20A, only one ONU can use the basic frame 5101 included in one superframe 5104. In the same manner, only one ONU belonging to the ONU group 20B can use the basic frame 5102, and only one ONU belonging to the ONU group 20C can use the basic frame 5103. In other words, according to this embodiment, one superframe serves to transmit a downstream signal to one ONU included in each ONU group 20A-20C.

In the embodiment shown in FIG. 14, the reception start times (5000, 5001 and 5002) of the header information 5110A, 5110B and 5110C are arranged at an equal interval to set the times 5001 and 5002 at 125 microseconds and 250 microseconds from the time 5000 which is the start position of the superframe. Accordingly, it is rarely necessary to change the downstream signal transmission plan dynamically during the operation of the PON system. When another ONU group is newly added during the operation of the system, the system must be suspended for a certain period of time to perform start-up processing including ranging of the newly added ONU. To this end, it will go well if the parameters required for the aforementioned operation in FIG. 14 are sent again to the existing ONUs as soon as the newly added ONU is completely started up. The payload start time in the superframe may be designated by use of the reception start time (and the reception end time) of the downstream signal transmission plan, but the light intensity map does not have to be referred to. When an operator or the OLT 10 sets the reception start time of each basic frame in the superframe and sends the reception start time to each ONU 20 in advance, the ONU 20 stores the sent information into the downstream light intensity map information 2071

Figures 15, 16:
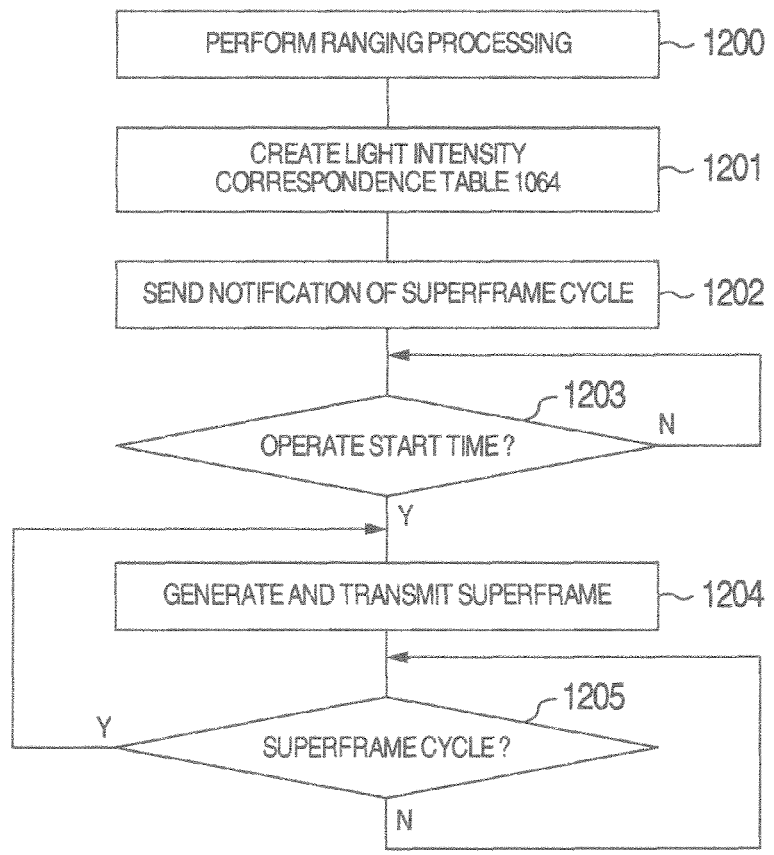
FIG. 15 is an example of downstream light intensity map information 2071 held by each ONU.
FIG. 16 is a flow chart showing an example of a processing procedure in the OLT 10 during processing of a downstream frame.

FIG. 15 shows an example of the downstream light intensity map information 2071, which illustrates information for an ONU belonging to the ONU group 20B by way of example. Operation start time 1400 is information to be sent to the ONU 20 by the OLT 10 in the processing 20040-B of FIG. 8. A superframe cycle 1401 is information to be sent to the ONU 20 by the OLT 10 in the processing S1015 of FIG. 10. Reception start time 1402 and reception end time 1403 are the times when the ONU 20 should start and end the reception of the basic frame 5102 in one superframe 5104, respectively. The reception start time 1402 and the reception end time 1403 are set or sent in advance by the operator or the OLT 10 before the start of operation. Alternatively, the reception start time 1402 and the reception end time 1403 are information obtained from reception start time 5162 and reception end time 5163 included in the downstream signal transmission plan 5150 with reference to the PLOAM field 5130B every time when a superframe 5104 is received.

FIG. 16 is a flow chart showing the schematic processing of the OLT 10. The ranging processing unit 1063 of the OLT 10 performs the ranging processing shown in FIGS. 7 to 9 on each ONU group 20A-20C (1200), and records each optical signal intensity used for ranging into the light intensity correspondence table 1064 (1201). The downstream frame processing unit 1210 of the OLT 10 notifies each ONU 20 of the transmission cycle of a superframe (1202). At the operation start time (1203), the downstream frame processing unit 1210 generates the superframe and transmits the superframe to each ONU (1204). After that, the OLT 10 transmits a superframe to each ONU in each superframe cycle (1205).

Figure 17:
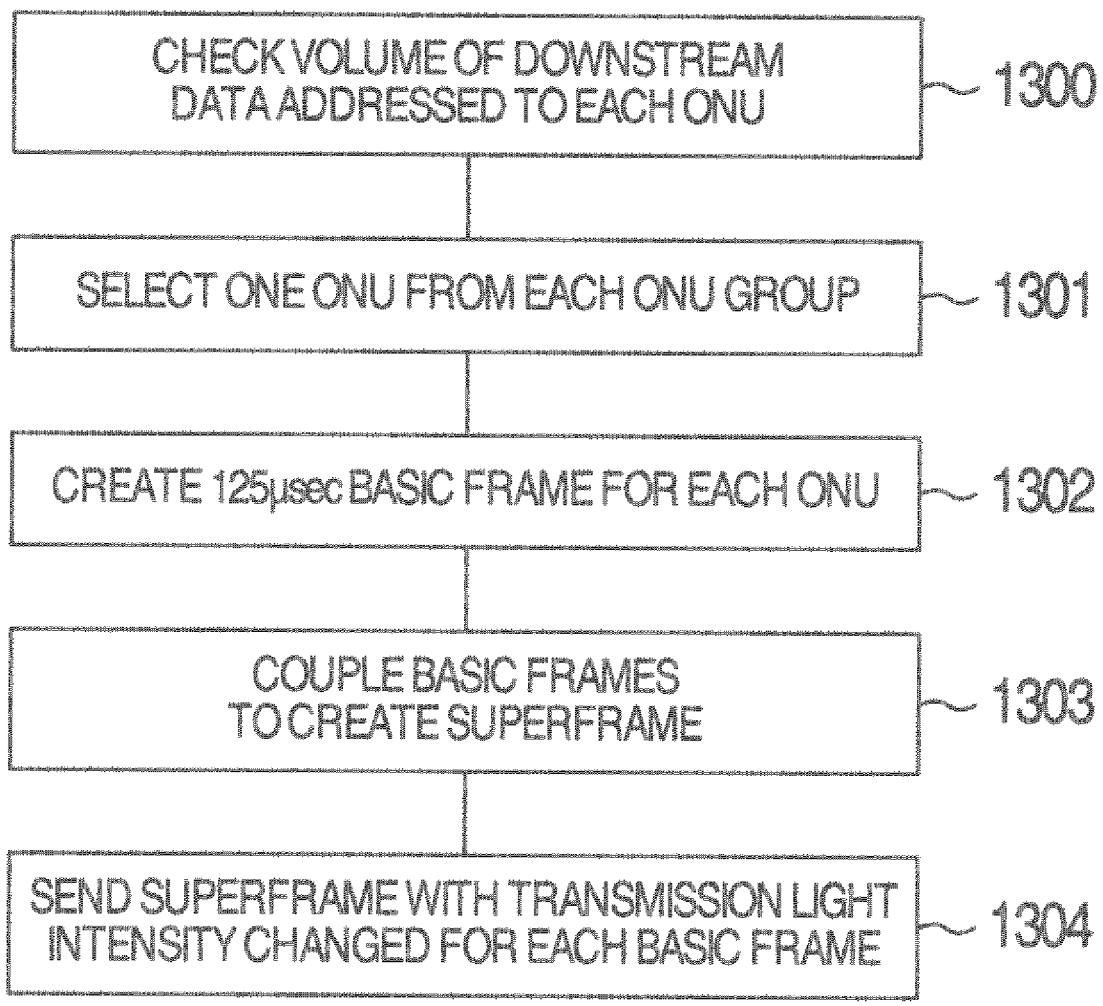
FIG. 17 is a flow chart showing an example of a superframe generating/transmitting procedure in the OLT 10.

FIG. 17 is a flow chart in which the processing 1204 in FIG. 16 is segmentized. The superframe generating unit 12107 of the OLT 10 checks the volume of downstream GEM frames generated by the GEM frame generating unit 12104 and addressed to each ONU (1300), and selects, from each ONU group 20A-20C, one ONU to which downstream data should be transmitted with a superframe which will be created and transmitted. Here, the superframe generating unit 12107 may, for example, select an ONU with the largest volume of downstream data from each ONU group by priority.

The superframe generating unit 12107 of the downstream frame processing unit 1210 uses the selected GEM frames addressed to the three ONUs to create three basic frames each having a 125-microsecond length (1302). Further, the superframe generating unit 12107 couples the three basic frames to create a superframe 5104 (1303). On this occasion, the ONU-ID of the ONU selected from each ONU group is stored in the ONU-ID 7001 of each basic frame. Finally, in a superframe cycle, the superframe generating unit 12107 delivers the superframe 5104 to the E/O 1310 and gives an instruction to transmit transmission light whose level is changed stepwise for each basic frame. On this occasion, the superframe generating unit 12107 gives an instruction to the E/O 1310 to provide light intensity which is obtained from the light intensity correspondence table 1064 through the transmission light intensity acquiring unit 12106 and which is suitable for each basic frame, that is, each ONU group. In accordance with the instruction, the E/O 1310 transmits the superframe 5104 while changing the intensity stepwise for each basic frame (1304).

Figure 18:
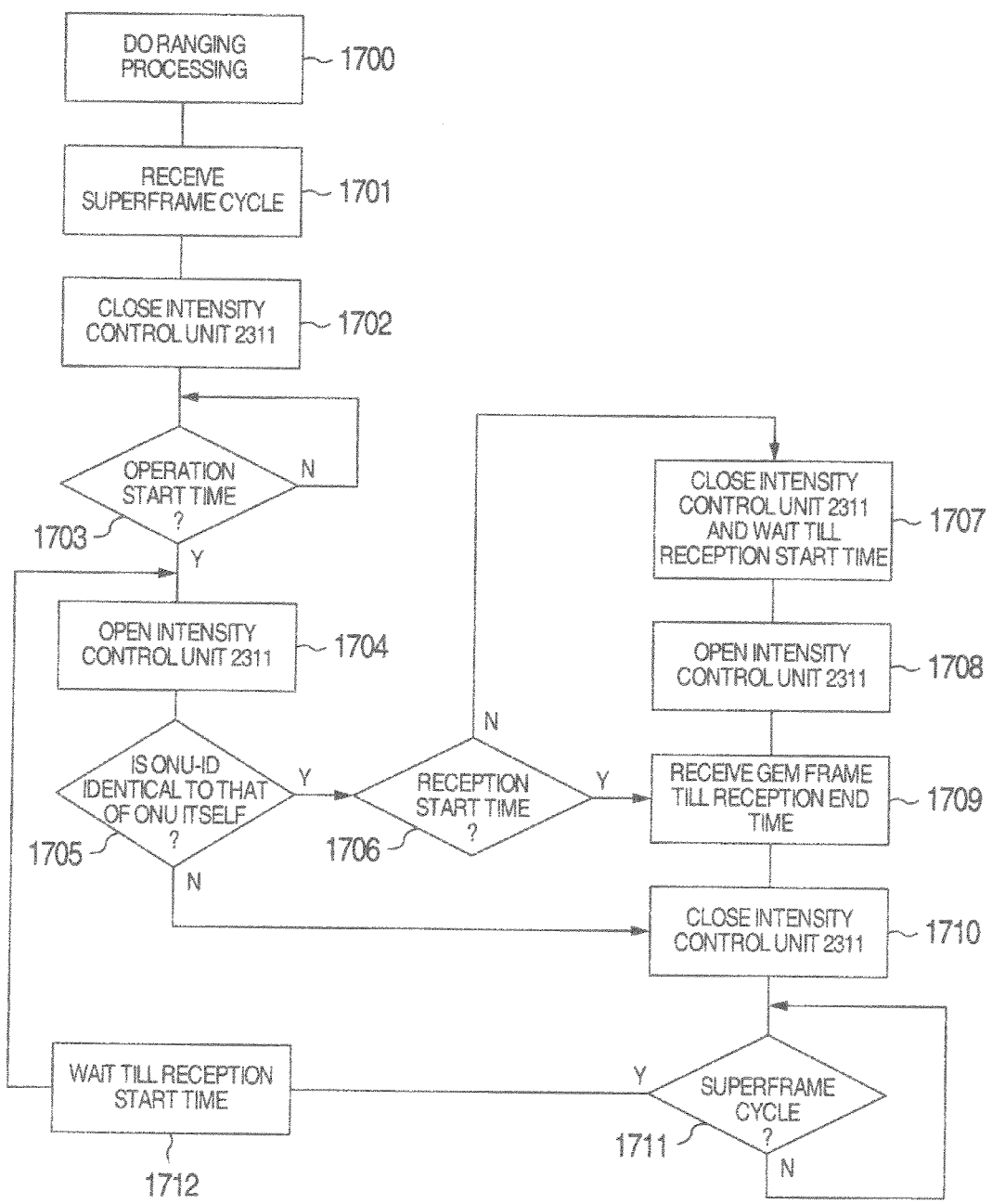
FIG. 18 is a flow chart showing an example of a processing procedure with which each ONU receives a superframe.

FIG. 18 is a flow chart showing the schematic processing of each ONU 20. The ranging request processing unit 22102, the ranging signal processing unit 20001 and the ranging response generating unit 24104 of the ONU 20 execute a sequence of ranging processing shown in FIGS. 7 to 9 (1700). On this occasion, as described previously, the ONU 20 secures temporal synchronization with the OLT 10 based on absolute time. When the downstream frame processing unit 2210 of the ONU 20 is notified of the superframe cycle by the OLT 10 (1701), the downstream frame processing unit 2210 stores the cycle into the downstream intensity map information 2071. In addition, though not shown in FIG. 18, operation start time is also sent from the OLT 10. The downstream frame processing unit 2210 also stores the time into the downstream intensity map information 2071 in the same manner. Then, any optical signal from the optical fiber 71 is blocked or attenuated by the intensity control unit 2311 provided in the O/E 2310 (1702).

The ONU control unit 2060 monitors whether the operation start time 1400 registered in the downstream light intensity map information 2071 has arrived or not (1703). At the operation start time, the intensity control unit 1703 makes control to allow an optical signal from the optical fiber 71 to pass (1704). The header analyzing unit 22101 refers to the header 5110 of a reference frame included in the superframe 5104 and determines whether the ONU-ID 7001 is identical to that of the ONU 20 or not (1705). When not identical, a frame addressed to another ONU of the ONU group the ONU belongs to is being transmitted. Thus, the ONU control unit 2060 controls the intensity control unit 2311 to block or attenuate the optical signal (1709).

When the ONU-ID is identical, the superframe 5104 in this time includes a frame addressed to the ONU. The ONU control unit 2060 refers to the reception start time 5152 included in the downstream signal transmission plan 5150 of the received basic frame and determines whether it is the reception time or not (1705). The ONU belonging to the ONU group 20A can receive the frame immediately. Therefore, Yes is obtained in this conditional branching. Thus, the ONU receives GEM frames addressed to the ONU until the reception end time 5153 (1708). In any ONU belonging to another ONU group 20B or 20C. No is obtained. Thus, the ONU control unit 2060 closes the intensity control unit 2311 and waits till the reception start time 5152 (1706).

At the reception start tune 5152, the ONU control unit 2060 sets the intensity control unit 2311 to allow an optical signal to pass (1707), and receives GEM frames till the reception end time 5153 (1708). At the reception end time the ONU control unit 2060 closes the intensity control unit 2311 (1709), and waits till the start time of the next superframe cycle (1710). In the next superframe cycle, the ONU control unit 2060 waits till the reception start time 1402 stored in the downstream light intensity map information 2071 (1712). In this embodiment, zero is given as the reception start time 1402 to the ONU belonging to the ONU group 20A, 125 microseconds and 250 microseconds are given to the ONUs belonging to the ONU groups 20B and 20C respectively.

Next, the procedure to register a new ONU 20 into the PON 1 during normal operation will be described with reference to FIG. 19. Here, all the ONUs in normal operation are referred to as ONUs 20-normal, while the ONU to be registered newly is referred to as ONU 20-new. First, the OLT 10 transmits a temporary suspension signal 40000 from the OLT 10 to the ONUs 20-normal so as to notify the ONUs 20-normal of temporary suspension of the normal operation (S-60000). Each ONU 20-normal receiving the temporary suspension signal 40000 (S-60010) reads normal operation restart time in the signal, and controls the intensity control unit 2311 of the O/E 2310 to block or attenuate any reception signal till the normal operation restart time (S-60020). Due to the received signal, each ONU 20-normal can prevent wrong reception from occurring or the optical receiver of the ONU from being broken or damaged due to a difference of light intensity in processing before normal operation, such as ranging processing that will be performed on the ONU 20-new. It is also possible to avoid interference between an upstream signal such as a ranging response signal 40020 transmitted later by the ONU 20-new and an upstream signal transmitted in normal operation by each ONU 20-normal. In the temporary suspension signal 40000, for example, normal operation restart time is assigned as next-time reception start time information in each light intensity map 5150-1 to 5150-K in a normal downstream frame. The ranging processing is tried using optical signals with various intensities from the OLT 10 to the ONU 20-new. Thus, the normal operation restart time is decided in consideration of enough time to terminate the ranging processing.

After the temporary suspension signal 40000 is transmitted, an installation agency or a user informed of that the ONU 20-new may be started up starts up the ONU 20-new (S-60030). After that, the OLT 10 transmits a ranging request signal 40010 to the ONU 20-new while adjusting the light intensity and the communication bit rate in the same manner as in the start-up operation of FIGS. 7 to 9, and waits for a ranging response signal 40020 from the ONU 20-new (S-60040). On this occasion, if an operator grasps the installation place, the distance information of the ONU, the communication bit rate, etc in advance, the operator may give an instruction to the OLT 10 to transmit an instruction about the light intensity and the communication bit rate of the ranging request signal 40010 to be transmitted. The ONU 20-new receiving the ranging request signal 40010 (S-60050) transmits a ranging response signal 40020 to the OLT 10 (S-60060).

When the OLT 10 receives the ranging response signal 40020 (S-60070), processing (40030, 40040 and 40050) before normal operation shown in the description of FIGS. 7 to 9 is performed between the OLT 10 and the ONU 20-new using the light intensity and the communication bit rate of the transmitted ranging request signal 40010. After that, the ONU 20-new controls the O/E 2310 to block or attenuate any received signal till the normal operation restart time sent by the OLT 10, and waits (S-60090). The contents of the processing at this time overlap with the contents explained in the description of FIGS. 7 to 9, and the contents will be omitted. On this occasion, the information of the ONU 20-new is added to the table information shown in FIG. 11, serving for later producing a downstream frame or creating a downstream signal transmission plan (S-60090). At the normal operation restart time, the OLT 10, the ONUs 20-normal and the ONU 20-new en restart normal operation (S-60100-OLT and S-60100-ONU).

FIGS. 20A and 20B show a second embodiment in which header information is collected in the head position of a superframe. Description will be made below on the assumption that an ONU 20A is one of the ONUs belonging to the ONU group 20A, an ONU 20B is one of the ONUs belonging to the ONU group 20B, and an ONU 20C is one of the ONUs belonging to the ONU group 20C.

The superframe 5105 according to this embodiment is arranged into a frame which includes a header 5110 and a payload 5120 for one ONU in each of the three ONU groups 20A, 20B and 20C and whose frame length is 375 microseconds, which is three times as long as 125 microseconds. The header unit 5110 and the payload unit 5120 include a header and a payload to be transmitted with certain light intensities respectively. When a plurality of light intensity signals are multiplexed and transmitted in the form of the superframe 5105, both header units and payload units are transmitted in order of increasing light intensity as shown in FIGS. 20A and 20B. Due to the transmission in order of increasing light intensity, the optical receiving unit of an ONU 20 close to the OLT 10 can be prevented from being damaged even if the ONU 20 receives an optical signal at a wrong early timing.

In the embodiment of FIGS. 20A and 20B, the payloads 5120 are transmitted after the headers 5110 of downstream signals are completely transmitted as to all the light intensities. Thus, the header units and the payload units have stepwise light intensity configurations respectively as shown in FIG. 20A. One of reasons why the light intensities are changed stepwise is to reduce, to the minimum, the risk of a receiving device failure caused by a sudden intensity change. The length of each header unit does not have to be integral times as long as the basic frame length of 125 microseconds, but the total length of the superframe 5105 is formed to be integral times as long as the basic frame length in FIG. 20A. When this configuration method is used, there is a merit that the design of an existing product can be changed easily because a 125-microsecond frame is used as a minimum frame configuration unit in an existing PON.

In the configuration example of FIGS. 20A and 20B, the downstream frame header 5110 has a configuration including header information 5110A for the ONU 20A, header information 5110E for the ONU 20B and header information 5110C for the ONU 20C. Each header information includes a downstream signal transmission plan 5150A, 5150B, 5150C for the corresponding ONU 20. For example, the header 5110A is transmitted with an optical signal at a level which can received by a plurality of ONUs belonging to the ONU group 20A. Each of the ONUs belonging to the ONU group 20A refers to the ONU-ID 7001 in the received header 5110A. Of them, one ONU 20A identifies the signal as a signal addressed to the ONU 20A processes the header and receives the payload. Here, any other ONU belonging to the ONU group 20A to which the signal is not addressed makes the intensity control unit 2311 to block or attenuate the received light till the next superframe cycle.

FIG. 20B shows a method for setting each parameter in the downstream signal transmission plan 5150 in order to perform processing on a downstream signal on the ONU 20 side. In the downstream superframe 5105, for example, available information addressed to the ONU 20A includes a frame header 5110A and a data unit 5120A. A fixed gap 5520 is formed between the header unit 5110A and the start time of the data unit 5120A where a GEM frame is stored, as shown in the frame configuration example of FIG. 20A. Information transferred in the gap 5520 include a header 5110B to be sent to the ONU 20B and a header 5110C to be sent to the ONU 20C. Each header information addressed to the ONU 20B or 20C has too high light intensity for the ONU 20A to receive. When the ONU 20A receives the header information, the optical receiving device of the ONU 20A may be damaged. Accordingly, in the ONU 20A, the reception light intensity control unit 2311 need to block or attenuate an optical signal as to the header information sent to the ONU 20B or the ONU 20C.

As described above, in this embodiment, blocking sections 5110B and 5110C are defined as an additional header region 5520 for the ONU 20A to allow the ONU 20A to properly receive the data unit 5120A after waiting in the blocking sections 5110B and 5110C. The following measure is used for allowing the ONU 20A to start receiving the payload (GEM frame) addressed to the ONU 20A as soon as the additional header region 5520 is terminated. First, assume that the length of each header unit 5110A, 5110B, 5110C is fixed. As a result, the interval between received times of headers is fixed in each ONU group. That is the frame length of the superframe 5105 is always fixed. When an individual ONU 20 is started up as described in the first embodiment, the ONU 20 is notified of time information, arrival timing (that is, normal operation start time) of a superframe (header unit 5110A, 5110B or 5110C) to be received first, and superframe length.

Thus, for example, each ONU of the ONU group 20A opens the intensity control unit 2311 in a superframe cycle and receives a header. The ONU 20A which recognizes the header as a header addressed to the ONU 20A itself closes the intensity control unit 2311 till the reception start time 5162 (time point 5003 in FIG. 20A) designated by the downstream signal transmission plan 5150. The ONU 20A opens the intensity control unit 2311 again in the period between the reception start time 5162 and the reception end time 5163 (time point 5004 in FIG. 20A) so as to receive a payload. After that, the ONU 20A closes the intensity control unit 2311 till the next superframe cycle.

Description has been made above about the signal configuration method and operation according to this embodiment using the case of the ONU group 20A by way of example. The same principle of operation can be applied to the ONU group 20B. The start position of the header unit 5110B corresponds to the end position of the header for the ONU group 20A, and the start position of the data unit 5120B corresponds to the end position of the data unit 5120A for the ONU group 20A. Thus, the header section 5110C for the ONU group 20C and the data section 5120A for the ONU group 20A should be regarded as an additional header 5620 by the ONU 20B. After reading the header 5110B, the ONU 20B closes the intensity control unit 2311 till the time point designated by the reference numeral 5004 in FIG. 20A, and opens the intensity control unit 2311 again between the time point designated by the reference numeral 5004 and a time point designated by the reference numeral 5005 so as to receive a payload 5120B. After the reception, the ONU 20B closes the intensity control unit 2311 till the next superframe cycle.

The same thing can be applied to the ONU group 20C. However, the ONU group 20C is the farthest ONU group from the OLT 10. Each ONU may not block but ignore light simply in any other part than a downstream frame addressed to the ONU. In the case of the ONU group 20C, it is not necessary to take influence or any optical device into consideration. For example, assume that the ONU 20C receives light, which is too weak in light level to be determined whether it is noise or a signal, in a part other than between the reception start position 5152 and the reception end position 5153 included in the header 5150C. Even in such a case, a low-light-level signal addressed to the ONU group 20A or the ONU group 20B can be ignored, for example, if setting is done not to issue any LOS/LOF (Loss Of Signal/Loss Of Frame) alarm.

Here in order to allow each ONU group to obtain header information from the start position of a header addressed to the group, a downstream signal synchronization pattern (PSync field, 0xB6AB31E0) according to ITU-T Recommendation G.984.3 is disposed in a head position of each header 5110A, 5110B, 5110C. Due to this configuration together with the predetermined header length, each ONU group can receive the header 5110 in each designated superframe cycle and receive the payload 5120 at timing designed in the header 5110

It should be further understood by those skilled in the art that although the foregoing description has been made on embodiments of the invention, the invention is not limited thereto and various changes and modifications may be made without departing from the spirit of the invention and the scope the appended claims.

The invention claimed is:

1. A communication system comprising a plurality of subscriber units, and a subscriber accommodating apparatus which is connected to the subscriber units by optical fibers through a splitter; wherein:
the subscriber accommodating apparatus includes:
a transmitter that transmits an optical signal through the optical fibers,
a first intensity control unit that changes intensity of an optical signal to be outputted frog the transmitter;
a control unit that measures communication distances from the subscriber units respectively, and measures intensities of optical signals the subscriber units can receive respectively, and
a frame processing unit that gives an instruction to the first intensity control unit to output an optical signal with first intensity when the optical signal is transmitted to a first group of the subscriber units which can receive the optical signal with the first intensity, and gives an instruction to the first intensity control unit to output an optical signal with second intensity when the optical signal is transmitted to a second group of the subscriber units which can receive the optical signal with the second intensity, based on measuring results of the control unit;
each of the subscriber units includes:
a receiver that receives an optical signal through a corresponding one of the optical fibers;
a second intensity control unit that changes intensity of an optical signal to be inputted into the receiver; and
a control unit that controls the second intensity control unit;
the frame processing unit of the subscriber accommodating apparatus notifies each subscriber unit belonging to the first group of a timing when the subscriber unit should receive the optical signal with the first intensity, and each subscriber unit belonging to the second group of a timing when the subscriber unit should receive the optical signal with the second intensity, respectively; and
the control unit of each of the subscriber units adjusts the intensity of the optical signal to be outputted to the receiver by the second intensity control unit, in accordance with the timing the subscriber unit is notified of by the subscriber accommodating apparatus.

2. A communication system according to claim 1, wherein:
the first intensity is weaker than the second intensity; and
the control unit of each of the subscriber units belonging to the first group controls the second intensity control unit to pass the optical signal with the first intensity so that the receiver can receive the optical signal at the timing of which the subscriber unit has been notified by the subscriber accommodating apparatus so that the subscriber unit should receive the optical signal, and the control unit controls the second intensity control unit to block or attenuate the optical signal at any other timing than the timing.

3. A communication system according to claim 1, wherein:
the communication system is a GPON system the subscriber units are ONUs, and the subscriber accommodating apparatus is an OLT;
the frame processing unit of the subscriber accommodating apparatus mounts a first basic frame with data addressed to one of the subscriber units belonging to the first group, mounts a second basic frame with data addressed to one of the subscriber units belonging to the second group, and periodically transmits, to the subscriber units, a coupled frame in which the first basic frame and the second basic frame are coupled; and
the control unit of each of the subscriber units controls the second intensity control unit in accordance with a transmission cycle of the coupled frame and position information of a basic frame to be received by the subscriber unit in the coupled frame.

4. A communication system according to claim 3, wherein:
the timing of which the subscriber accommodating apparatus notifies each of the subscriber units so that the subscriber unit should receive the optical signal with the first intensity at the timing is position information of the first basic frame in the coupled frame; and
the timing of which the subscriber accommodating apparatus notifies each of the subscriber units so that the subscriber unit should receive the optical signal with the second intensity at the timing is position information of the second basic frame in the coupled frame.

5. A communication system according to claim 4, wherein:
the frame processing unit of the subscriber accommodating apparatus:
stores the position information of the first basic frame into a PLOAM field of the first basic frame; and
stores the position information of the second basic frame into a PLOAM field of the second basic frame.

* * * * *